US006667972B1

(12) United States Patent
Foltan et al.

(10) Patent No.: US 6,667,972 B1
(45) Date of Patent: Dec. 23, 2003

(54) METHOD AND APPARATUS PROVIDING MULTI-SERVICE CONNECTIONS WITHIN A DATA COMMUNICATIONS DEVICE

(75) Inventors: Andrew S. Foltan, Nashua, NH (US); Raymond G. Bahr, Natick, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,699

(22) Filed: Jan. 8, 1999

(51) Int. Cl.[7] .............................................. H04L 12/66
(52) U.S. Cl. ...................... 370/354; 370/353; 370/392; 370/469; 370/352
(58) Field of Search ................................ 370/351, 352, 370/353, 354, 356, 358, 386, 389, 392, 397, 395.31, 395.43, 395.5, 395.52, 395.61, 395.64, 401, 409, 465, 466, 467, 469, 471, 493, 494, 495

(56) References Cited

U.S. PATENT DOCUMENTS 6,240,084 B1 * 5/2001 Oran et al. .................. 370/352
6,445,682 B1 * 9/2002 Weitz ......................... 370/257

* cited by examiner

Primary Examiner—Douglas Olms
Assistant Examiner—Phirin Sam
(74) Attorney, Agent, or Firm—Hamilton, Brook, Smith & Reynolds, P.C.

(57) ABSTRACT

A method and apparatus provide a data communication device that can process a number of streams of data according to a plurality of services. A host device such as a network access server which may include a router and a number of carrier cards hosts a number of modules. The host and modules are equipped with a messaging application programming interface (API). The API allows the host to discover what services are offered by the modules, and allows the host and modules to form an optimal interface configuration that most effectively handles data connections of different service types, such as voice, data, facsimile, video and so forth. In operation, each module is presented with a stream of data containing multiplexed calls. Each call contains data that is best operated on by one of the particular services. The messaging API allows the host to setup and control the module and sessions of the services offered by the modules depending upon the data types of the connections. Since the modules each offer a variety of services, a stream containing data one or more connections such as voice data, video data, modem data, facsimile data and so forth can be processed by a single module under control of the host.

22 Claims, 11 Drawing Sheets

METHOD AND APPARATUS PROVIDING MULTI-SERVICE CONNECTIONS WITHIN A DATA COMMUNICATIONS DEVICE

BACKGROUND OF THE INVENTION

Computer networking uses various data communications techniques to transmit information from one computer to another over a network. A typical network includes a series of interconnected data communications devices that can each store and forward or exchange data from one device to another, enabling the exchange of information. In a typical computer networking application, source and destination computers are personal computers, workstations, or the like which each include a modem or other transmitter that is used to transmit the data from the computer. The modem accepts data from an application executing on the computer and encodes the data according to one or more of a number of standardized data communication protocols. The modem can also decode data that is received. The specific protocol selected may be based on the function of the application in use and may create data having a specific associated type.

Depending upon which applications are in use, there may be many different types of data transmitted and received across a network. For example, voice data, video data, facsimile data and traditional application data (referred to as modem data) can all be digitized and encoded according to respective encoding protocols, with each protocol designed to optimally handle data of its specific type. Voice data for instance, must be sampled frequently and in real-time, and thus the mechanisms (i.e. protocols) used to send and receive voice data typically use small packet sizes that must be transmitted and received in a predetermined order over data links offering a more or less guaranteed quality of service (QoS). Conversely, regular application (modem) data can be transmitted using large packets that need not arrive in real-time nor in any particular order and delays in transmission are generally allowable.

Quite often, a network connection originates at a source computer host when data is transmitted from the modem to a central telephone switching office over a telephone line, for example. The central office may host connections from several source or destination computers each coupled via modem to the central office over dial-up or dedicated connections. Each connection is tantamount to a phone call and is frequently referred to simply as a "call" or a "DS0." There may be a number of central offices linked together which form a connection-based wide area network or WAN. To send the data on each call in each central office to a large packet-based computer network such as the Internet, the calls are multiplexed onto transmission links, such as T1, T3, E1, TDM or OC3 links, each of which offers a high bandwidth and high data rate. These high speed multiplexed links are coupled to a network access server (NAS).

Access servers are typically located at the facilities of an Internet Service Provider. An access server accepts the high bandwidth multiplexed links and routes the call connections containing the modulated data to a packet network. The access server also accepts data packets traveling in the reverse direction from the packet network to remote hosts located on the WAN.

Within an access server, the high bandwidth TI, T3, E1, TDM and/or OC3 links containing calls from the WAN are received by a framer. The framer accepts the high bandwidth connections and outputs a number of Time Division Multiplexed (TDM) streams, each of which can include many multiplexed calls in associated timeslots. Each portion of data or DS0 in timeslots associated with each call has an associated data type, such as voice data, video data, facsimile data, modem data, or another type of data.

Each TDM stream is directed to a module to handle data within calls carried in that stream. A module is generally a circuit card that can accept and process the call data in one or more TDM streams according to a single service associated with that module. The module processes the calls in that TDM stream according to a service for which the module was designed. In other words, the specific module selected is dependant upon the type of data in the TDM stream. For instance, a module designed for voice data may be able to accept and process a TDM stream containing up to 32 simultaneous voice calls. Another module may be designed to accept calls containing video data, and another for modem data. The modules accept the TDM streams and convert the data for each call into a packet format for eventual transmission to a packet network.

In some prior art systems, a module that is designed to handle a specific type of data, such as commonly transmitted modem data, can use its modem data configuration to handle others types of data. As an example, a module configured for modem data can typically be configured to service voice data as well. The module configuration refers to such things as the length and number of data and message queues provided in the module, the protocol error checking used, and the data handling protocols that are used by the module. A module configured for modem data may, for example, use longer queues and create large packets full of data, while a module configured for voice may use short queues and create many packets with smaller amounts of data due to the real-time requirements of voice.

Modules configured to service one data type may use that configuration to service data of other types. In such cases, the underlying configuration of these modules does not change. Rather, the modules merely piggyback or shoehorn other data types into the constructs used for the original configuration. As an example, voice data can be transmitted through a module designed with queue lengths and protocols which are optimized for handling packets of modem data.

In the access server, a number of modules are typically coupled to another circuit card called a carrier card. A typical carrier card can host up to six modules. Like the modules, carrier cards are designed to most effectively handle data streams associated with the modules which they host. By way of example, a carrier card that hosts six voice modules is specifically designed to work with voice data, while a carrier card that hosts modem data modules is designed to most effectively handle streams of modem data. In a typical access server, there can be multiple carrier cards of different types, each hosting multiple modules.

In other access server systems, the modules can couple directly to a router backplane without a carrier card. The router backplane includes a router processor. The router processor is configured to specifically communicate with the modules. In either the case of a module/carrier card configuration, or the module/backplane configuration, an access server can service many various types of data connections by routing the different call types to modules designed to best serve the data in the call connections.

The backplane links connections from modules to one or more computer networks such as the Internet. The backplane may include knowledge of what type of data is being provided from a specific carrier card and/or module. Thus, if the backplane processor detects a carrier card hosting voice modules, preference may be given to data passing to and from this carrier card due to the real-time nature of voice data. Generally however, the backplane accepts the packetized data connections from each carrier card/module configuration and routes them to an appropriate computer network segment. In the reverse direction, the backplane accepts packets from the computer network segments and routes them to an appropriate module where the service converts the packet data to TDM stream data.

SUMMARY OF THE INVENTION

Prior art data communication devices such as the access server noted above suffer from a variety of inefficiencies in design and implementation. In particular, modules within an access server are more or less dedicated to servicing connections of a specific type, such as modem data, voice, video, facsimile, or another data type. The configuration of queue lengths, error correction schemes, protocols and so forth is generally fixed in prior art modules. If a protocol changes, the fixed configuration of the module may not support the new features of the protocol. As such, new modules may be required to support new protocols and carrier card design may be effected as well.

Another problem with prior art access server systems is that modules are designed to offer one basic type of service, such as voice or data. The protocols provided by the modules do not optimally adapt to servicing other types of data. This results in lower throughput rates when a module services connections which it is not optimally designed to service.

Carrier cards are also designed to support particular module types. Thus, a carrier card designed to support modem modules may not work efficiently or even at all when used to support modules designed to service voice call connections. As a result, different carrier card and module combinations must be installed in an access server to effectively service connections of different data types. This increases manufacturing costs since both specific carrier cards and modules are produced to handle different types of data.

The invention overcomes these problems. The invention provides a module that is generic in nature and that can provide protocol support for a number of different services. The module is called a multi-service module. A multi-service carrier card is also provided which is designed to support the multi-service modules. A messaging interface system is provided for a data communications device that is hosting the modules to determine the services available from the modules and to configure a module most appropriately for data processing according to those services. Preferably, this system allows a host to provide a module with information concerning its capabilities. In turn, the module can indicate to the host what services are offered by the module. The interface system uses a shared memory to hold the queues and allow the exchange of messages in one embodiment.

According to another aspect of the invention, a module provides data communications services. The module includes an interface for transferring a plurality of streams of data into and out of the module. The interface includes at least one port capable of transferring incoming and outgoing streams of multiplexed data. A shared memory is also coupled to the interface and includes a plurality of data queues. Each data queue buffers incoming and outgoing streams of packet data. A plurality of service processing units are provided in the module and are coupled to the shared memory. The service processing units support a plurality of services which operate on the streams of data being accepted through the interface.

The service processing units accept and process incoming streams of multiplexed data according to one of the services. The units convert the incoming streams of multiplexed data to outgoing streams of packet data and accept and processes incoming streams of packet data according to one of the services and convert the incoming streams of packet data to outgoing streams of multiplexed data. Also contained on the module is a processor which is coupled to the shared memory, the interface, and the service processing units. Generally, the processor controls the operation of the module to subject the streams of data to the plurality of services.

The services offered by the service processing units can be fax services, voice services, modem services, data services, and so forth. The invention is not limited to these services, but rather, can provide all types of protocols processing and data services, including encryption, compression, encoding, decoding, and the like. For each type of service, such as voice, data and video, a specific set of messages called a message catalog is provided. Thus, there may be a voice message catalog, a video message catalog, a data message catalog, and so forth. Each message catalog comprises messages that may be sent from the host to the module to configure the service associated with that catalog on the module. For example, if a module offers voice, video and digital data services (e.g., ISDN), the host can use specific messages from a voice message catalog, a video message catalog, and a data message catalog to configure each of those services for use within the module as those types of data are required to be processed. The messages from the message catalogs can perform such tasks as selecting a specific data rate for the service, adjusting flow control, parity, and so forth.

In operation of the interface system of this invention, an identity table is created within the shared memory upon start-up of the module. The identity table contains information identifying each of the plurality of services supported by the module. A host configuration table is also created upon start-up of the module in the shared memory. The host configuration table identifies the configuration of a host that is hosting the module. A downloaded module image runs on the module processor and reads the host configuration table to determine the configuration of the host that is hosting the module and creates the information identifying each of the services supported by the module and places the information in the identity table allowing the host that is hosting the module to read the identity table to determine the plurality of services are offered by the module. In this manner, the invention supports a mechanism between host and a module to identify the module and its services and to configure the host and module to support those services.

Also included on the module is a session manager process executing on the processor. The session manager process accepts session commands on the interface to control the service processing units supporting the services. A module manager process is provided that executes on the processor of the module as well. The module manager process accepts module commands on the interface to control the operation of the module. The shared memory includes a control queue and a status queue which are separate from the data queues. These queues receive the session commands and module commands over the interface from a host hosting the module so that the host can control operation of the module and its services.

To control each service within the modules, the host and modules are equipped with a plurality of service message catalogs, one per service offered by the module. Each service message catalog contains messages related to particular services offered by a module. A host processing unit selects and sends particular messages selected from a service message catalog associated with a service to the module to establish, control and configure the service within the module. The service can thus process the a data communications session according to the service. Message catalogs that are provided are a digital data message catalog, an in-band signaling message catalog, a data/fax/voice message catalog, and a packet gateway services message catalog.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
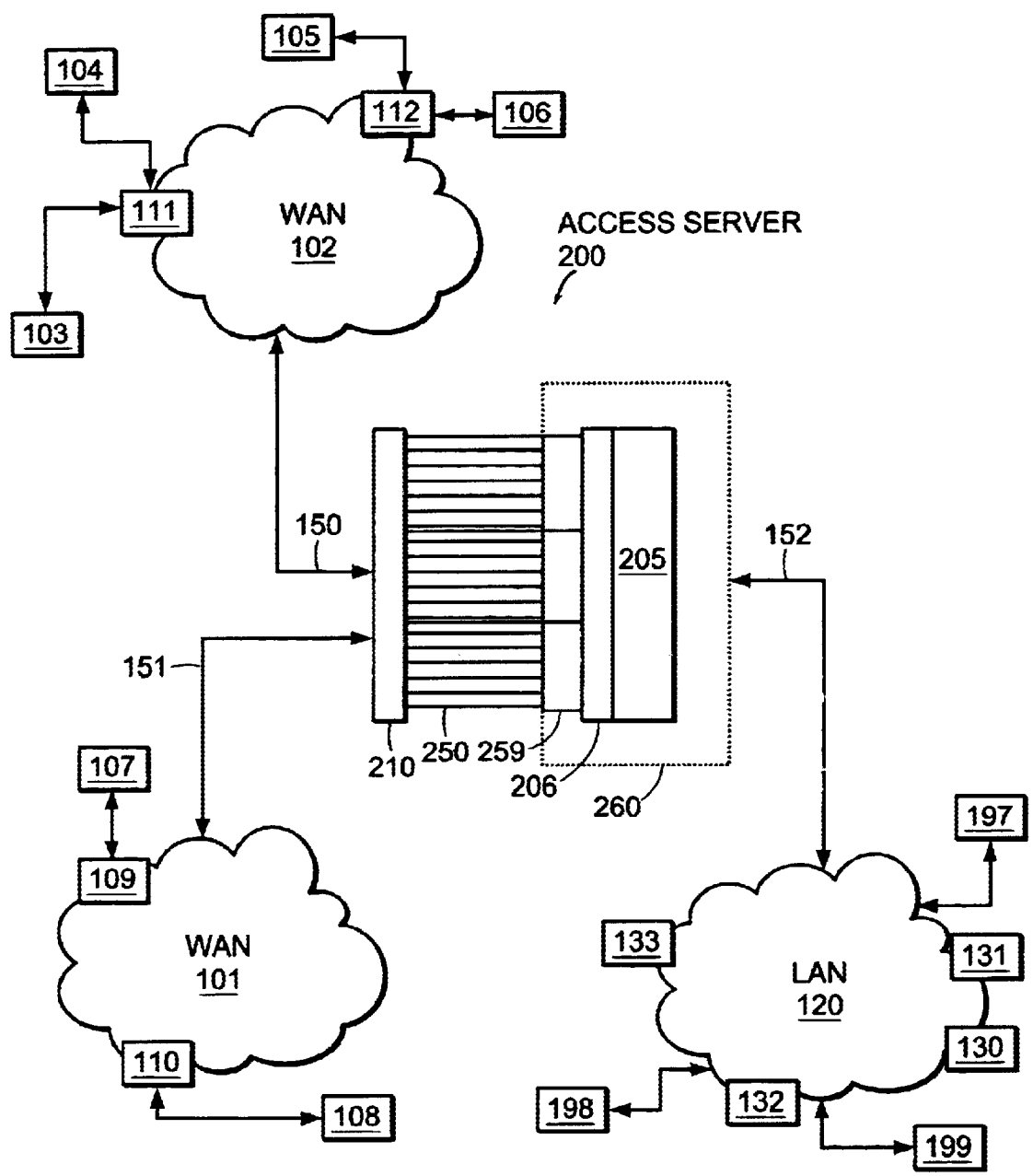
FIG. 1 illustrates a networking environment including a data communications device configured according to the present invention.

FIG. 1 illustrates an example of a data communications networking environment including an access server 200 configured according to the invention. Wide Area Networks (WANs) 101 and 102 are connection-based networks linking central offices 109, 110 and 111, 112, respectively. WANs 101 and 102 may be public switched telephone networks (PSTNs), ISDN networks, ATM networks, X.25 networks or another type of circuit switched or switched virtual circuit network. Remote systems 103 through 108 interconnect with a respective WAN 101 or 102 which in turn interconnect to access server 200 via high bandwidth communication links 150 and 151. Links 151 and 151 may be, for example, T1, T3, E1, OC3 or other links which can support multiplexed circuit switched connections. Remote systems 103 through 108 represent end user equipment and execute various data communications applications which send and receive data such as voice, facsimile, modem data and data of other types.

The access server 200 also couples to Local Area Network (LAN) network 120. In this example, LAN network 120 is a connectionless packet-based computer network which interconnects remote computers 130 through 133. Computers 130 through 133 execute applications which, for example, use the TCP/IP protocol suite to communicate. Other access servers 197, 198 and 199 are also coupled to LAN computer network 120 and provide access to and from other remote networks which are not shown in this example.

Within the access server 200 there are one or more trunk cards 210, also called framers, which provide interfaces for connections to and from the high bandwidth links 150, 151. Streams of data to and from remote systems 103 through 108 are provided on WANs 101, 102 as individual connections called "calls" or "DS0s". Links 150 and 151 support these DS0 call connections in a time division multiplexed (TDM) format so that many simultaneous calls can exist on links 151 and 151 at one time. The framers 210 accept the call connections on links 150 and 151 and create streams of Time Division Multiplexed DS0's. Each TDM stream includes frames of individual DS0's, with each DS0 occupying one timeslot in a frame. Each call connection may, for example, be associated with one or more of the DS0's occupying a timeslot in the frame of a TDM stream. In high-bandwidth applications such as video connections, it may be the case that the video connection is actually associated with more than one DS0 timeslot in a frame of a TDM stream. In such cases, the DS0s associated with the video connection are referred to collectively as a channel. The framer 210 channels each TDM stream to a port (not shown) on one of the multi-service modules 250.

A module 250 configured according to this invention is able to service the individual call connections (DSOs, or groups of DS0's in the case of a channel) in a TDM stream, with each call (or channel) carrying data for one or more of a variety of services such as voice, video data, modem data, and so forth. The modules are mounted on the carrier cards 259 which, in this example, couple to the trunk cards 210 and the controller cards 206 and the router 205. The purpose of the modules 250 is to convert data from WANs 101 and 102 to data on LAN (i.e., computer network) 120, and to convert packet data from LAN 120 to call connection data for WANs 101 and/or 102. In other words, the modules 250 support services which handle data conversion between the two networks.

A single service is a protocol executing on the module that processes connection data between the WAN and LAN networks 101, 102 and 120. Generally, receive data arrives on a TDM channel from framer/trunk cards 210 and is processed by the service in the module 250. After processing, the data is placed in a data queue for the router 205 which transmits the data in packet form to LAN 120. In the other direction, data from packets on the LAN 120 is placed in a data queue (not shown) by the router 205 and is processed by the service in the module 250 and is then placed in an appropriate timeslot of a TDM stream for transfer to one of WANs 101, 102.

The modules 250 provide protocol support between the access server 200 and WANs 101 and 102. Such support includes, but is not limited to G.711, G.728, G.729 and other voice protocols including any appropriate voice activity detection and echo cancellation; modem protocols V.90, V.34, V.32 and their derivatives as well as other legacy modem protocols; Facsimile protocols such as T.30, T.4 and T.6 for FAX receive, FAX transmit and FAX relay; HDLC, ISDN and PPP protocols, SLIP, V.42, MNP, DSL/ADSL and its variations, ITU V.110 and V.120, and any other protocols that require support for services between networks such as WAN 101 and 102 and computer network 120.

Within the access server 200, the modules 250 are physically mounted on carrier cards 259. Each carrier card 259 can support up to six modules 250, each of which can support connections of various service types such as data, voice, facsimile, video, and so forth. Depending upon how many connections are to be supported by the access server 200, there may be many carrier cards 259 supporting up to six modules 250 each.

In alternative embodiments, the modules 250 can directly interface with a backplane (not shown) of the router 205, and the carrier cards 259 are not required. In this instance, the modules 250 are said to be "hosted" by the router 205, since the router 205 contains the processing capabilities that interact with the modules 250. In FIG. 1, a host 260 is illustrated within dotted lines that include the external processing components (either carrier card 259 and/or router 205) that form the host 260 that communicates with the modules 250 using the interface of this invention. That is, a host 260 with which a module 250 interfaces to exchange data and/or commands may be a carrier card 259, a router 205 or another data processing device providing the functionality of the host 260 and module 250 interface as described herein. It is to be understood however that the architecture of access server 200 in FIG. 1 is provided by way of example only and is not limiting of this invention.

One aspect of the invention relates to the techniques and mechanisms that allow the multi-service modules 250, carrier cards 259 and router 205 to support connections of different services without dedicating modules 250 or other resources to supporting only specific services. Specifically, this aspect of the invention defines an interface between a module 250 and a host 260 (i.e., either carrier card 259 or router 205) that hosts one or more modules 250. A module 250 can be queried by a processor located in the host 260 to determine which services are provided by that module 250. An application programming interface is provided by the invention between the host 260 and the modules 250 which allows each to determine the services and capabilities of the other. As a result, the host 260 can most efficiently configure itself and the module 250 for data transfer based upon the types of services supported within the module 250.

Aspects of the invention are described in the context of an access server by way of example only, to aid in the description of the invention. The invention is not limited to use in an access server, but rather, is generally applicable to other types of data communications equipment that process data according to one or more services, such as routers, switches, hubs, bridges, repeaters, or other data trafficking devices.

Figure 2:
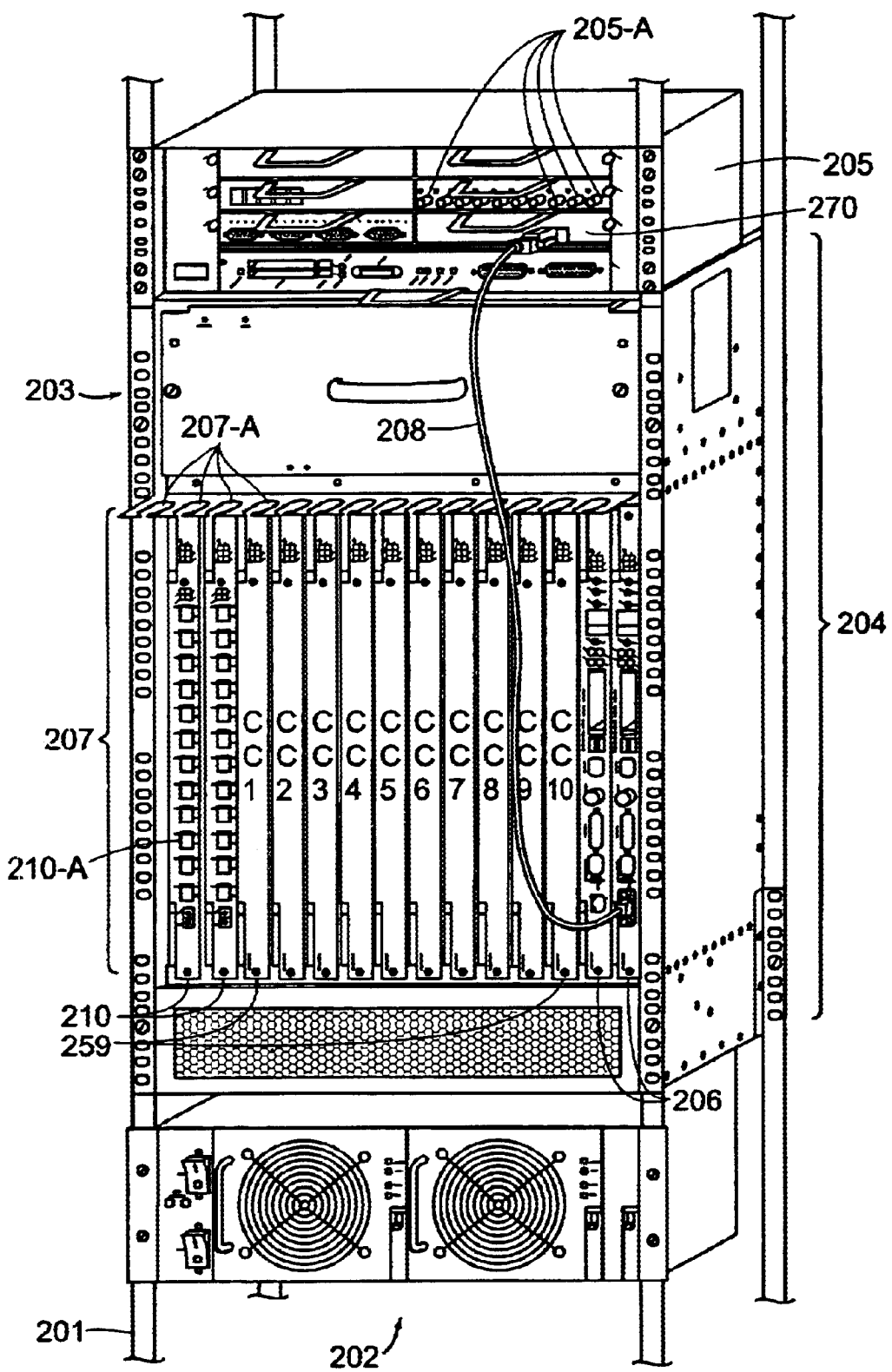
FIG. 2 illustrates the components that comprise an access server configured according to the invention.

FIG. 2 illustrates a more detailed view of the access server 200. The access server 200 includes a chassis 201, power equipment 202 (labeled as AC-input power shelf in the figure), blower assembly 203 for cooling, a dial shelf 204, and a router 205. The dial shelf 204 handles the connections to and from any circuit switched or switched virtual circuit networks such as WANs 101, 102 (FIG. 1). The router 205 handles the interconnections to the packet-based networks, such as the LAN computer network 120 (FIG. 1). A typical example of a dial shelf 204 is the Cisco 5814 dial shelf and an example of the router 205 is the Cisco 7206 router shelf. An example of an access server 200 in which this invention may be implemented is the Cisco AS5800 Network Access Server. Each of these components is manufactured by Cisco Systems, Inc. of San Jose, Calif.

The dial shelf 204 includes a number of circuit board components which mount in slots 207-A within card cage 207. In this configuration, framer cards 210 (also referred to previously as trunk cards) are positioned in the two left-most slots 207-A, and include WAN connections 210-A to which T1/E1/OC3 or other links 150, 151 (FIG. 1) can interconnect. The framer cards 210 remove framing and embedded signaling bits (or insert them depending upon direction of data flow) in the data and an onboard framer CPU (not shown) sends the data stream to an onboard time division multiplexing (TDM) resource which breaks out and passes each TDM stream over the backplane (not shown) to an appropriate module 250 (FIG. 1) hosted on one of the carrier cards 259 (CC1–CC10).

In this example, there are ten carrier cards 259 individually labeled CC1 through CC 10, and two controller cards 206 which are inserted into respective slots 207-A of the dial shelf 204. A backplane (not shown in this figure) inside the dial shelf 204 provides electrical interfaces for each card 210, 259 and 206 that is inserted into the card cage 207.

The router 205 includes network connectors 205-A which can couple to network segments on LAN 120, such as the data link 152 (FIG. 1). The router 205 includes a processor (not shown in this figure) that executes a routing process (i.e. protocol) that can route and send and receive packets to and from LAN 120. The router 205 also includes an dial shelf interconnect port 270 which allows the router 205 to exchange data with the dial shelf 204 via one or more dial shelf interconnect cables 208 (only one shown in this example). Dial shelf interconnect cable 208 serves as a data transfer mechanism between the packet-based connections (e.g., 152 in FIG. 1) coupled to network connectors 205-A in the router 205 and the circuit switched connections (e.g., 105, 151) coupled to WAN connections 210-A in the dial shelf 204. Alternative configurations of a system according to this invention, such as an access server, may provide the router 205, carrier cards 259, and other cards (i.e. framer cards 210) as individual circuit boards which slide into a common backplane within a single shared chassis (as compared to a separate router and dial shelf as shown in FIG. 2).

Figure 3:
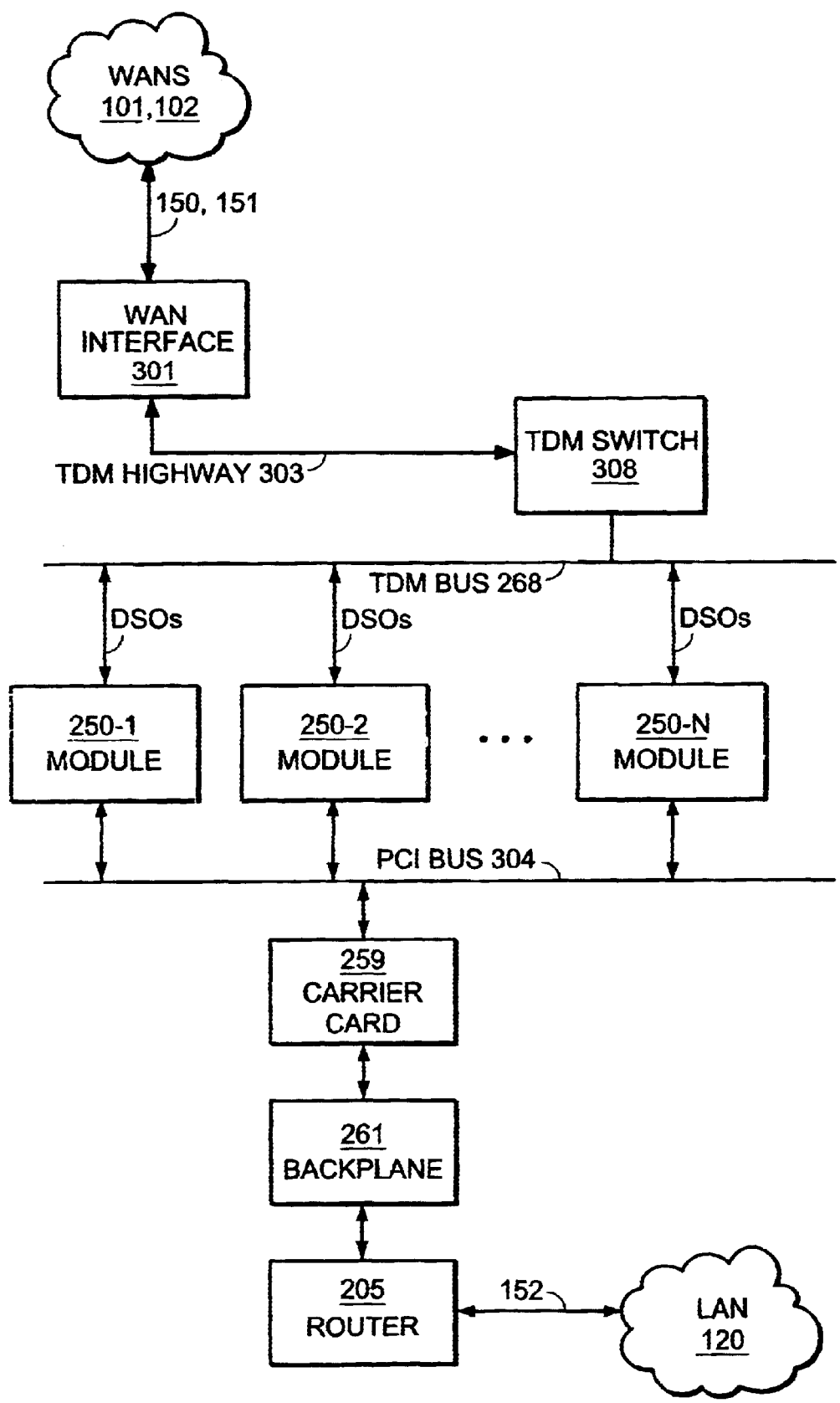
FIG. 3 illustrates a schematic data flow diagram showing the transfer of data through a data communications device configured according to this invention.

FIG. 3 illustrates the schematic architecture and data flow within the access server 200 configured according to this invention. In this example, WAN interface 301 accepts call (DS0s) from WAN 101 and/or 102. The calls (not shown) are multiplexed together into TDM streams (not shown) on TDM highway 303. The TDM streams are transferred to TDM switch 308 which channels each stream to a module 250-1 through 250-N via TDM bus 268. According to this invention, each module 250-1 through 250-N can accept multiple TDM streams containing multiple DS0s of varying call types (i.e. data types). As such, each call channeled over TDM bus 268 to a module 250 may transport data associated with one or more service types on the module. The data within each call on TDM bus 268 is converted by one of the services (not shown in FIG. 3) associated with the module 250 to which that call data is transferred. After conversion, the data is transferred to the carrier card 259 via PCI bus 304. The data then travels over the backplane 261 to the router 205 where it is routed on the LAN 120.

A typical service (not shown) in a module 250 converts TDM DS0 data (i.e. call data) to packet data (and as explained below, can also convert packet data to TDM DS0 data). The data conversion process used (i.e., the service used) depends upon the data type (i.e., modem data, facsimile data, video data, voice data, etc.).

In the reverse direction of data flow, data (i.e. packets) destined for a remote system on WANs 101 and/or 102 are received at the router 205 from the LAN 120. The packets are routed through the backplane 261 to the carrier card 259 and then to one of the modules 250-1 through 250-N that provides the appropriate service connection for the packets. The module 250 receives the data and uses one of its services to convert the packet data into TDM stream data. The resulting data is then multiplexed onto an appropriate TDM stream on TDM bus 268 and is passed off the module 250 through TDM switch 308 to the TDM highway 303 that couples to the WAN 101,102 through WAN interface 301.

The invention particularly relates to how a host platform (i.e. either a carrier card 259 or router 205 or other data communications device) that hosts the modules 250 can communicate with, query, configure, and control the modules 250, their services, and data connections serviced through the modules 250. A unique interface between the module(s) 250 and the hosting platform is provided for this purpose.

Figure 4:
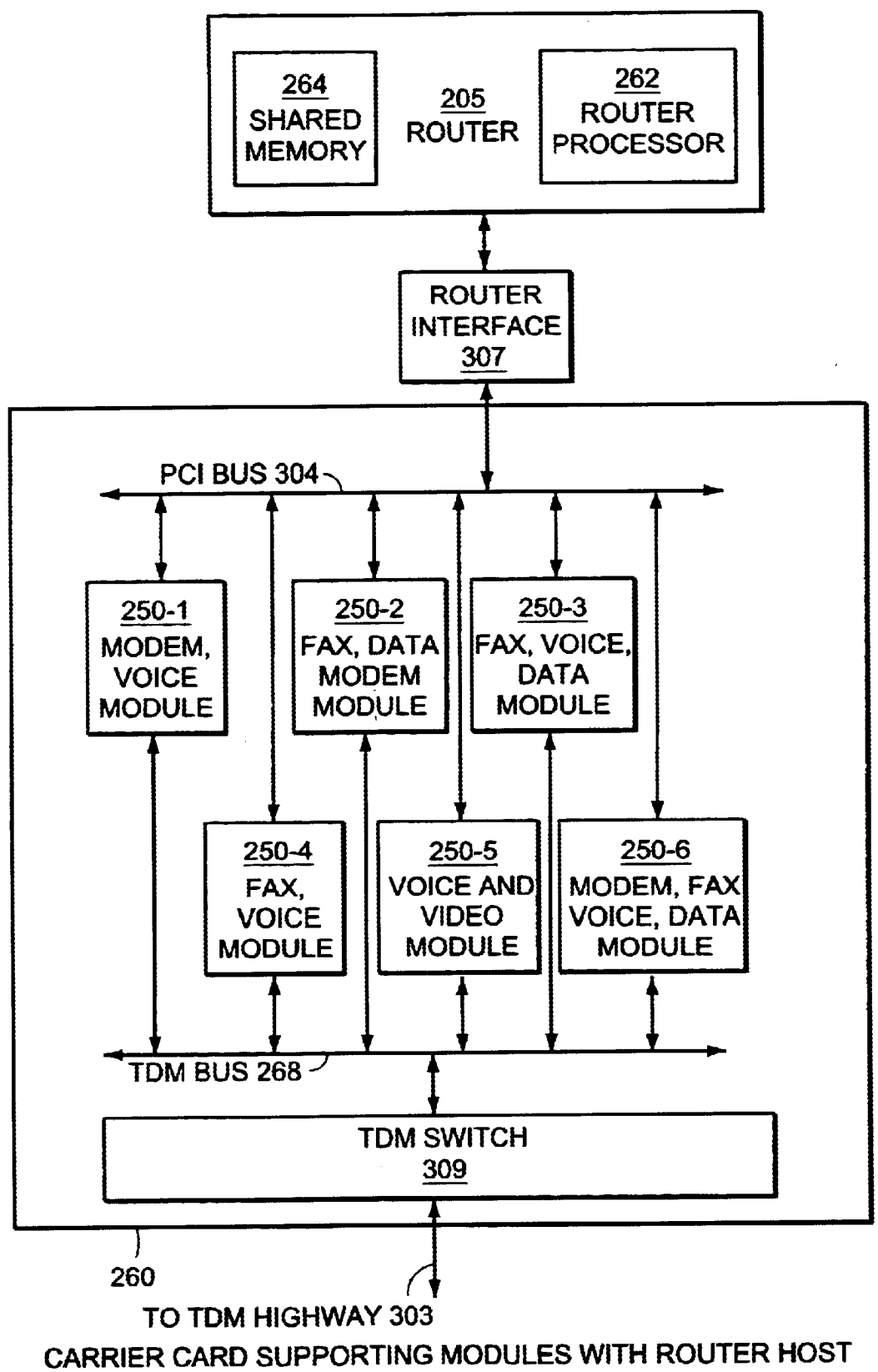
FIG. 4 illustrates a multi-service carrier card hosting a number of multi-service modules configured according to the invention.

FIG. 4 illustrates a block diagram of a single carrier card 259 within access server 200. The carrier card 259 in this example supports six modules 250, though more or less may be supported in other embodiments. As indicated in the figure, each module 250-1 through 250-N is labeled as supporting a variety of different services including modem data, video data, voice data and fax data. The TDM bus 268 can, in this example, support up to four 8 Mbps TDM streams per module 250, for a total of up to 512 calls per module 250. TDM bus 268 couples to a carrier card TDM switch 309 which channels the TDM streams to and from the TDM highway 303. The PCI bus 304 allows the transfer of packet data between each module 250-1 through 250-N and the router 205 via router interface 307. In this diagram, router interface 307 represents the backplane 261 (FIG. 3), controller cards 206 (FIG. 2), and interconnect cables 208 (FIG. 2). In other words, router interface 307 represents the required hardware and processing circuitry to establish an interface between the carrier card 259/module 250 configurations and the router 205.

As indicated in this example, the router 205 includes host processor 262 and shared memory 264. As such, the router 205 is said to be the host with which modules 250-1 through 250-N communicate. In alternative embodiments, the host processor 262 and shared memory 264 may be located on the carrier card 259, in which case the carrier card 259 would be referred to as the "host". In another embodiment, the shared memory 264 can be maintained on the modules 250 themselves, while the host processor 262 is either on the carrier card 259 or is within the router 205. The term "host" generally refers to the processing device(s) with which the modules 250 communicate as explained with respect to this invention. The point is that the invention is not limited to a specific location for a host processor 262 or memory 264 with which the modules 250 communicate (as will be explained). The various embodiments will be described later in various levels of detail. Those skilled in the art should understand that the particular design is not limited to these descriptions.

The shared memory 264 (within the router 250 in this example) supports the dynamic configuration of queues and buffers (not shown in this figure) which allows the transfer of data through the modules 250. This queue and buffer configuration is provided by one aspect of the invention. Since each module 250 can support a variety of connection services such as voice, data, fax, digital data (i.e. ISDN), video, and other services, the shared memory 264 can be configured using the invention to optimally define the queues, buffers and other data structures required on a service by service and port by port basis. Generally, each service is defined by one or more standardized protocols which may be best implemented in use by configuring queues, buffers, and other processing resources to settings designed to best carry out those services. This invention allows a host 260 to determine the services offered by a module 250, and then allows a configuration to be established that can best be used by those services.

The multi-service capability provided by each module 250 and the host 260 (preferably either the carrier card 259 or router 205) and the manner in which these services are configured and controlled allows a single module 250 to supply any service to any call connection at a prescribed density. The system of the invention covers the design of the interaction (i.e., the interface) between the router 205, the carrier cards 260, and the modules 250 along with the messaging application programming interface (API) used to control this interaction. The interaction, as will be explained, includes an initial configuration process during which the host 260 and module 250 exchange information to determine the features (i.e., service and processing resources) offered by each, as well as the processes through which the host and modules can establish active data communications sessions whereby the data is subjected to the services of the modules 250. As will be explained, this system provides the ability to vary the configuration of a host 260 such as a carrier card 259 or router 205 and a module 250 to best accommodate each type of data service.

The entire design and operation of the system of the invention, including module 250 design, the interface between the modules 250 and a host 260, and the messaging techniques and message catalogs (to be explained) that exist and that are used for specific services represent preferred embodiments of this invention. It should be understood, however, that the invention is not limited to the exact designs expressed herein. Rather, the scope of the invention is meant to cover these embodiments, processes, aspects and features, as well as the general system concepts explained and as claimed.

Continuing on, most communications applications that execute on remote systems 103–108 and 130–133 (FIG. 1) require varying amounts of access server data communications resources, such as memory, processor bandwidth (to handle service requirements), and data throughput bandwidth. These resources are dependent upon the specific service(s) (i.e., fax, voice, video, data) required by the applications. The messaging API of the invention allows a host 260 (i.e. router 205 and/or carrier cards 259) to communicate with the modules 250 to determine communications capabilities and/or services supported by the modules 250. As such, as the access server 200 (or other data communications device equipped with the invention) processes streams of data between networks (i.e., LAN 120 and WANS 101, 102, FIG. 1), module resources (i.e, memory, services, processor bandwidth) can be configured and controlled via the host 260 by scheduling modules 250 to service data connections according to the services offered by those modules 250. Before data stream processing occurs, the host 260 and module(s) 250 perform an initial configuration communication process. This initial configuration communication preferably takes place upon power-up or "boot-up" of the data communications device, which is the access server 200 and specifically the router 205 in this example.

For example, based upon the messaging that takes place (to be explained), a host 260 (e.g., router 205 or carrier card 259) can inquire as to the connection support services offered by a module 250, and the module 250 can respond to the host 260 with the services offered. The messaging system also allows connections to be established for services (i.e., voice, video, data, facsimile) offered within the modules 250, and allows setup and tear-down processes for sessions of the services to be carried out. The messaging API of the invention allows the module 250 and/or the carrier card 260 to be configured with varying degrees of flexibility to most efficiently allocate module 250 and host 260 resources. By providing this handshaking system, modules 250 and hosts 260 can obtain information about the facilities of each other and future changes in one component or the other can be understood and taken into account during communications processing. Thus, if a new module 250 is provided with an updated or completely new data communications service, the host 260 can discover this feature and will be able to handle streams of data associated with the updated or new service.

Figure 5:
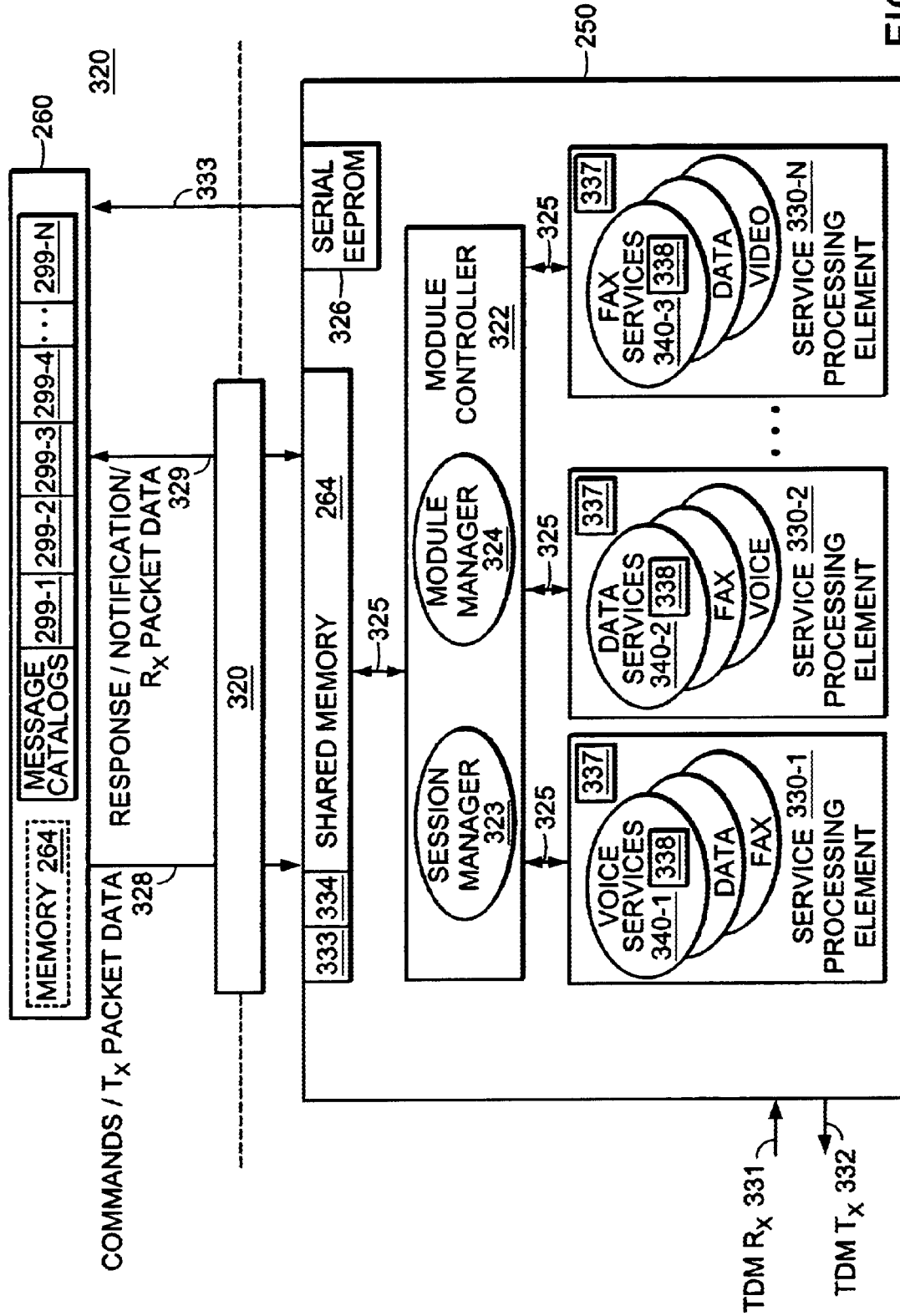
FIG. 5 illustrates a block diagram of a multi-service module configured according to the invention.

FIG. 5 illustrates a block diagram showing the design of a module 250 as interfaced with a host 260. As illustrated, module 250 interfaces with host 260 via the interface 320. In this example host 260 may be the carrier card 259 or router 205 as previously described. In alternative embodiments, the host 260 may be a backplane or other communications processing device (e.g., switch processor, bridge processor, hub processor, and so forth) that allows the module 250 to interface with some sort of data network, such as LAN computer network 120.

In this embodiment, the main components within the module 250 are shared memory 264, a module controller 322 and a number of service processing elements 330-1 through 330-N. These components are coupled via module busses 325. A serial EEPROM 326 is provided to permit the host 260 to automatically identify the module 250 via module identification signal 333 during or just prior to initial configuration. The reader should note that this figure illustrates the alternative embodiments in which shared memory 264 can either exist on the host 260 or within the module 250. The shared memory 264 is responsible for maintaining various message and data queues and buffers (not shown in FIG. 5) which are used to store and forward data as it is processed and passed through the module 250. As will be explained in more detail further, Identity Table (IDT) 333 and Host Configuration Table (HCT) 334 are setup and maintained in shared memory 264 during configuration and operation and are used to configure and manage the module 250.

Module controller 322 is the central processing unit for the module 250 and executes a module manager process 324 and a session manager process 323. The module manager process 324 is responsible for communicating with the host 260 to establish the initial module configuration which includes the setup and sizing of queues and other structures in shared memory 264 during startup of the access server 200. Generally, the host 260 and module 250 relationship is a master/slave relationship where the host 260 is the controlling master. That is, the host 260 governs and controls the overall actions of the module 250, and the module 250 reports back to the host 260 the status of requests and commands sent by the host 260. Instances where the module 250 initiates communication which is not generally in response to a command from the host 260 are limited to mostly error conditions.

Also illustrated in FIG. 5 are service message catalogs 299-1 through 299-N. Service message catalogs 299 are used by the host 260 to control aspects of individual services 340 within the module(s) 250. A more detailed discussion of the services message catalogs 299 will be presented later.

Preferably, a module 250 has a physical 3.5 by 5 inch form factor, and uses a 140 pin board-to-board connection which provides stacking support for stacking multiple modules 250 on top of one another. The system uses industry standard interfaces wherever possible and provides full hardware support for legacy software applications and services. The interface 320 also provides JTAG support for testing, programmable logic support and processor emulation support. Performance in a preferred embodiment of a module 250 supports four full duplex 8 Mbps TDM streams of 128 DS0s. The onboard bus 325 is capable of providing support for the above noted data rates. Module controller 322 provides enough computing power to support the intended application services 330.

During the operation of module 250, connections 331, 332 and 328, 329 are established and supported via the various service processing elements 330. TDM DS0 stream data (302 in FIG. 3) is illustrated both as TDM Tx (transmit) data 331 and TDM Rx (receive) data 332 in FIG. 5, while datagram or packet data 306 is illustrated as transmit data 328 and receive data 329. While illustrated as separate interfaces for illustrative purposes, all interfaces between a module 250 and host 260 can be incorporated into one physical connection interface such as the 140 pin interface noted above.

All references to transmit and receive data (both TDM and packet data) are in relation to the TDM highway 303 (FIG. 4). Thus, TDM Rx (receive) data 331 arrives at the module 250 on TDM highway 268 (FIG. 4), is processed by a service 340 in the module 250, and is then transmitted as Rx (receive) packet data 329. Rx packet data 329 is referred to as "receive packet data", even through it is actually transmitted from the module 250 through the host 260 out to the LAN 120. This is because the all data in this description is called either receive or transmit data in relation to its direction of flow from the module 250 onto or off-of the TDM highway 303. Accordingly, in the reverse direction, packet data arriving at the host 260 (i.e. router 205 in FIG. 3) from LAN 120 is referred to as Tx (transmit) packet data 328, even though it is "received" from LAN 120. Again, this is because with respect to the TDM highway 303, the Tx packet data 328 is transmitted and not received.

Each incoming DS0 connection within the TDM Rx receive data 331 is switched to one of the service processing elements 330, depending upon the type of data in the connection. The session manager process 323 handles miscellaneous tasks associated with each individual DS0 connection 302, such as assigning an incoming DS0 connection on TDM Rx line 331 to a particular service processing unit 330 where a service 340 handles processing the data. As will be explained, commands from the host 260 are used to interact with the session manager process 323 on the module 250.

Preferably, each service processing element 330 is a digital signal processing (DSP) engine that provides data processing for one of more of the services 340 offered by module 250. As illustrated in this example, service processing unit 330-1 offers services 340-1 including voice, data and fax protocols. Other services 340-2 through 340-N are provided by the other service processing elements 330-2 through 330-N. The service processing elements 330 handle the packetization and de-packetization of data in streams 331, 332 according to the configuration of the service processing unit 330 providing the service 340 for that stream 331, 332.

As an example, if a TDM stream 331 is carrying modem data, upon connection setup (to be explained), the session manager 323 associates that DS0 stream with a service processing unit 330 that is configured to most efficiently handle modem data, such as service processing unit 330-2. The service processing unit 330-2 accepts the received stream on 331 and demodulates the data according to the service selected for that stream, such as V.32bis. The data is then forwarded on to a queue (not shown in this figure) in shared memory 264 where it awaits retrieval by the host 260. The host 260 then obtains the data 328 from the shared memory 264 and forwards it towards its eventual destination.

As an example of data flow in the reverse direction, as packets or datagram data 329 is received over the interface 320 from the host 260, they are buffered in data queues (not shown) in the shared memory 264. The session manager 323 associates each packet with a service processing unit 330-1 through 330-N depending upon the addressing or routing information provided from either the packet of data itself or from out-of-band signaling received from the host 260. The service processing unit 330 obtains and processes the data from shared memory 264 according to the service for the data type of the received data. The service may be, for example, a voice, fax, video, or modem protocol. After the data is serviced, the session manager 323 forwards the data on to the appropriate TDM transmit stream 332.

Before the module 250 can be used to service data as explained in the above examples, a start-up handshaking procedure is performed between the host 260 and each module 250. In a preferred embodiment, IDT and HCT tables 333, 334 are configured in shared memory 264 during this start-up process. These tables 333, 334 contain information required to describe all aspects of the interface between the host 260 and the module 250.

Table 333 is known as an Identity Table or IDT 333. The address of the identity table 333 is the only item that the host 260 must know in order to establish communications with the module 250. The exact location of the Identity Table 333 is located in the header of a downloaded software image that is sent to the module during the start-up procedure. Once the address of the identity table (IDT 333) is determined by the host 260, software executing on the host 260 or a platform coupled to the host 260 can process the identity table to determine the characteristics of the port card module 250. An example of software which embodies the messaging and API host capabilities of this invention is the Cisco Internetworking Operating System (IOS) software produced by Cisco Systems of San Jose, Calif.

The IDT 333 contains the information that describes where certain message and data queues are located in shared memory 264. This queue information allows the host 260 to then query the module 250 to identify the service capabilities, applications, and protocols that the module 250 supports. Other information such as if the module 250 can operate in an initiator or target configuration for messaging, and if interrupts are used, can also be discovered. Using this mechanism, the host 260 can optimize both the location of data in shared memory 264 as well as the queue sizes and data buffer memory allocated to optimize the interface between the host 260 and module 250. Another significant benefit of this approach is that the host 260 can re-use the same code and mechanisms to communicate with any module 250 which supports these discovery and configuration mechanisms. Aside from IDT and HCT tables 333, 334, a sophisticated service message catalog set is provided and a queuing interface is established to enable communication and data transfer between the host 260 and the module 250.

Figure 6:
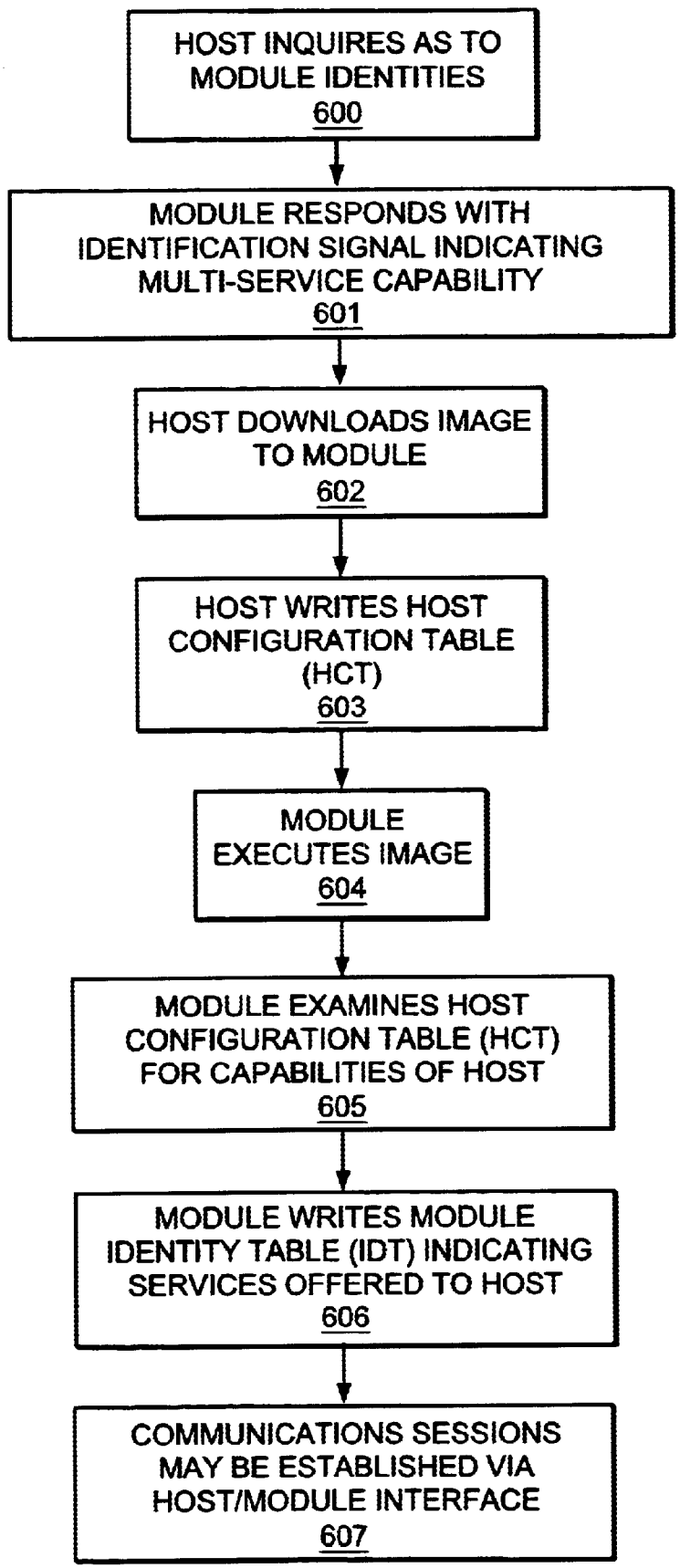
FIG. 6 is a flow chart of the initial processing steps performed to configure the interface between a host and a module.

FIG. 6 illustrates at a high level the general operation that takes place between a host 260 and a module 250 to determine the identity and configuration of the module 250 and what services 340 are offered by the module 250. The power is turned on to the system platform (host 260 and module 250) and the host 260 inquires in step 600 as to what types of modules 250-1 through 250-N are being hosted thereon. The module 250 responds in step 601 with the unique identification signal 333 indicating to the host 260 that the module 250 supports the configuration capabilities as described in this invention (i.e., the module responds it is a NextPort module). Then, in step 602, the host platform 260, under control of the Internetworking Operating System (IOS) processing, downloads an executable image into the module 250. The host 260 also writes the contents of the HCT table 334 into shared memory 264 thus identifying itself to the module 250 in step 603. In step 604, the module 250 begins to execute the downloaded image. In step 605 the module 250 examines the HCT table 334 which tells the module 250 what the host 260 platform is (i.e., router, switch, etc.) and what capabilities are offered by the host 250. In step 606, the module 250 writes the IDT table 333 into shared memory 264. The IDT table 333 indicates information to the host 260 concerning what module services 340 are offered and what queues and buffers will be required to support those services. Once configured the module 250 and host 260 have been configured in this manner, communication sessions can be established (Step 607) and the host 260 can control the general operation of the module.

As outlined above, a primary aspect of the invention is to provide a universal module card application programming interface (API) solution that does not limit or pre-define the format and sizes of data objects (queues, buffers, etc.) used between the modules 250 and the host 260. As such, this aspect of this invention is open-ended with respect to the definition of the interface structure and queue mechanisms used and allows protocol advancements to drive configuration requirements. Once the queues are established, the bulk of host-module communications, such as session management, can be carried out via messages sent using the queuing structures in shared memory 264. Before a more complete description of host-module operations is provided, a discussion of the queue structures is in order.

Figure 7:
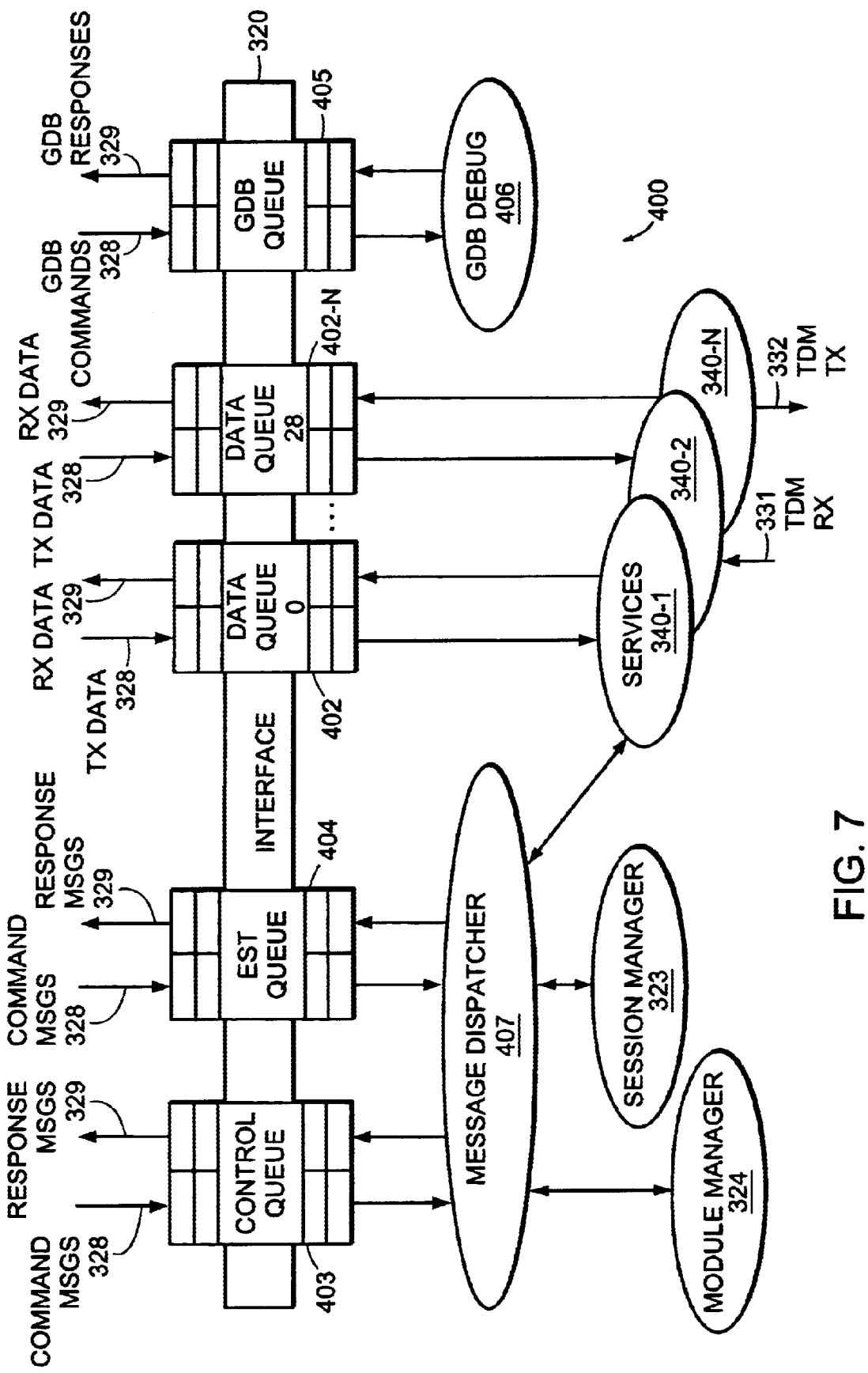
FIG. 7 illustrates a mode detailed view of the interface and queuing mechanism which exists between a module and host configured according to the present invention.

FIG. 7 illustrates a preferred queuing interface 400 that is established to enable communications between a carrier card 259 and a module 250. The queuing interface 400 defines the communication mechanism used to control module services 340 executing on a platform, such as access server 200. The interface 400 further defines the mechanism used to identify the capabilities of module 250. The interface 400 replaces the need for the host 260 to be concerned with the implementation details of services 340.

The interface 400 provides the ability to communicate with the module 250 using both in-band and out-of-band message queues 402 through 405. In-Band queues 402 through 402-N are used to exchange data between the host 260 and the services 340-1 through 340-N executing on one of the service processing elements 330-1 through 330-N (FIG. 5) within the module 250. As such, in-band queues 402 are also called data queues.

Out-of-band queues 403 through 405 are used to exchange data between the host 260 and the module 250's management facilities which include the module manager 324, session manager 323 and GDB debugger 406. Out-of-band queues 403 through 405 support out-of-band messages (i.e., control and command messages sent between the host 260 and the module 250) using the message dispatcher 407. Specifically, the out-of-band queues 403 through 405 are the control queue 403, the Error-Status-Trace (EST) queue 404, and the GDB Debug queue 405. The control and EST queues 403, 404 together provide the mechanism for transmission of module and session management commands, responses and messages from the host 260 to the module 250, and vice versa. The GDB Debug queue 405 is handled by the GDB Debug process 406 and is used to debug module processing if needed.

Preferably, queues 403 and 404 are required on modules 250 that meet the interface described herein as the invention. The GDB debug queue 405 is used for debugging module 205. The control queue 403 supports command messages from the host 260 to the module 250 and also supports response notification messages sent from the module 250 to the host 260. The EST queue 404 supports query messages from the host 260 to the module 250 and error, status, and trace messages from the module 250 to the host 260.

All queues 402 through 405 in the interface 320 (shown as 400 for the overall interface design) use a common handshake mechanism and queue format to exchange data. As example queue format and handshaking mechanism uses buffer descriptors and ring buffers (known in the art) to exchange data between the host 260 and the module 250. All queues 401 through 405 within the interface are preferably bi-directional and use the same transport process regardless of the direction of the data flow.

It is to be understood that while the queue structure illustrated in FIG. 7 is a preferred embodiment, the invention is not limited to using queue such a queue design. For instance, the messaging and configuration that takes place between a module 250 and a host 260 could be performed with using as few as one queue, or as many queues or other types of data structures (linked lists, stacks, heaps, etc.) as may be required or desired in a memory such as shared memory 264. Alternatively, instead of queues, direct electrical connections in the form of signaling lines could be used to transmit the configuration and messaging information between host processor 262 and module processor 322. Those skilled in the art will readily understand that there may be many equivalent communication strategies that can be employed to effectuate such communications.

The shared memory 264 serves as the medium in which queues 402 through 405 are established. The exact queue configuration depends upon the services 330 offered by the module 250 and is established at system start-up. Preferably, each module 250 can support up to thirty-two (32) queues 402 through 405. These include the control queue 403, the EST queue 404, the GDB queue 405, and up to 29 data queues 402-1 through 402-N. Each queue 402 through 405 is assigned a unique ID value and is provided with a set of bit field flags (not shown) to support referencing the queues, handling interrupt processing, controlling messages, and so forth. Each queue 402 through 405 is established during the module startup procedure which will be described in detail next.

During the start-up process, in order for a host 260 to determine what services are offered by a module 250, the host 260 and module 250 create tables 333 and 334 in shared memory 264 as previously noted. Initially, the host 260 maintains the module 250 in a reset state while the host 260 creates the HCT table 334 in shared memory 264.

The contents of the Host Configuration Table 334 is provided below:

TABLE 1

Host Configuration Table 334

| | FIELD NAME | DESCRIPTION |
| --- | --- | --- |
| 1 | Magic_Value | A unique value that is used to identify the start of the table. |
| 2 | Host_Version | Software version number in use by the host. |
| 3 | Host_Memory_Base | Indicates the host PCI base address used for module-to-host address translations. |
| 4 | Host_Memory_Limit | Indicates how much memory is available to be mapped into a module address map. |
| 5 | Control_TX_Queue_Address_Offset | Byte address offset of the base of the control receive message queue 403. |
| 6 | Control_RX_Queue_address_Offset | Byte address offset of the base of the control transmit message queue 403. |
| 7 | EST_TX_Queue_Address_Offset | Byte address offset of the base of the EST receive message queue 404. |
| 8 | EST_RX_Queue_Address_Offset | Byte address offset of the base of the EST receive message queue 404. |
| 9 | Max_Streams_Supported | Indicates maximum number of TDM streams supported for this module. |

The Host Configuration Table (HCT) 334 (Table 1 above) contains specific configuration information that the host system 260 passes to the module 250 during the startup procedure. That is, the HCT 334 is located in the shared memory 264 on the module 250 and is populated with the values for each field listed in the HCT 334 shown above. Preferably, there are nine fields (numbered 1 through 9 in this example) and each field is a 32 bit word. In practice, the module 250 is configured to have read-only access to the HCT 334, while the host 260 has read-write access.

The Magic_Value (field 1) and Version_Number (field 2) fields are used to identify to the module 250 the start of the HCT 334 and what software version number is being used to communicate with the module. The Host_Memory_Base (field 3) field is an address field used to compute memory addresses between the host 260 and the module 250. In a preferred embodiment, address translations are performed using offsets from this based value given in field 3. Host_Memory_Limit (field 4) indicates the amount of shared memory 264 space that the module 250 must map into its local address space in order to support memory accesses as a PCI initiator. The Control_TX_Queue_Address_Offset and Control_RX_Queue_Address_Offset (fields 5 and 6) fields indicate the start of the control queue 403 transmit and receive areas, while EST_TX_Queue_Address_Offset and EST_TX_Queue_Address_Offset (fields 7 and 8) specify the offsets in memory 264 to the EST queue 404 transmit and receive areas. Finally, Max_Streams_Supported (field 9) specifies the number of TDM streams that the host 260 can physically support or provide to the module 250. The module 250 reads the value of field 9 in the HCT 334 and adjusts its capabilities accordingly during the start-up process, as will be explained.

The contents of the Module Identity IDT Table 333 is provided below:

TABLE 2

Module Identity Table 333

| FIELD NAME | DESCRIPTION |
| --- | --- |
| 1 Magic_Value | A unique value that is used to identify the start of the IDT table. |
| 2 Module_Version | Software version number in use by the module. |
| 3 Module_Memory_Base | Indicates the host PCI base address used for host-to-module address translations. |
| 4 Module_Memory_Limit | Indicates how much memory is available to be mapped into a host address map. |
| 5 Queue_Memory_Address_Offset | Indicates the address offset of on-module memory 264 that is available to the host 260 for queues 402 through 402-N and buffers. |
| 6 Queue_Memory_Size | Indicates the size of the on-module queue memory as a count of words. |
| 7 GDB_TX_Queue_Address_Offset | Byte address offset of the base of the GDB debug transmit queue 404. |
| 8 GDB_RX_Queue_Address_Offset | Byte address offset of the base of the GDB receive message queue 404. |
| 9 Max_Streams_Supported | Indicates maximum number of streams supported by this module. |

The IDT 333 (contents shown in Table 2) identifies specific information about the features of the module 250 and is accessible by the host 260. The descriptions of each field are provided in the table. Essentially, the IDT 333 reports to the host 260 the features and services 340 that the module 250 supports and also conveys any information needed to configure and control the module 250 during its support for services 340. The module 250 fills the IDT 333 once during the initialization process. Preferably, the contents of the IDT 333 remains constant from that point on. Alternatively, periodic updates to the IDT 333 can be subsequently detected by the host 260 in order to signal, for example, a new version of a protocol that has been downloaded into the module 250 from a source, such as the router 211.

In this embodiment, the information in both the IDT 333 and HCT 334 is presented in a fixed format. If additional fields are required in either table at a later date, the new fields can be added at the end of the table thus maintaining compatibility with existing mechanisms which use table fields that existed before any new fields are added. As an example, as new fields are added to the IDT 333, older legacy hosts 260 may not immediately recognize the new fields. However, adding to the end of the IDT 333 table allows the legacy hosts 260 to ignore the new fields that define new services or updated or advanced features and allows the legacy hosts 260 to only process the original fields in the IDT 333. This allows new features to be added to the modules 250 while maintaining backward compatibility with older carrier card hosts 260 that support the overall interface design of this invention but that do not support the new features or services. Once added, however a field in the IDT 333 or HCT 334 cannot be removed or redefined for a different purpose, so as to maintain compatibility standards. If a field in either table 333 or 334 becomes obsolete or is no longer needed for a service that is unused, it merely becomes a placeholder. Alternatively, a mechanism could be used to indicate to the host 260 or module 250 how many fields exist in the IDT and HCT tables 333, 334 and which ones are related to which services, thus providing an un-fixed format.

Figure 8:
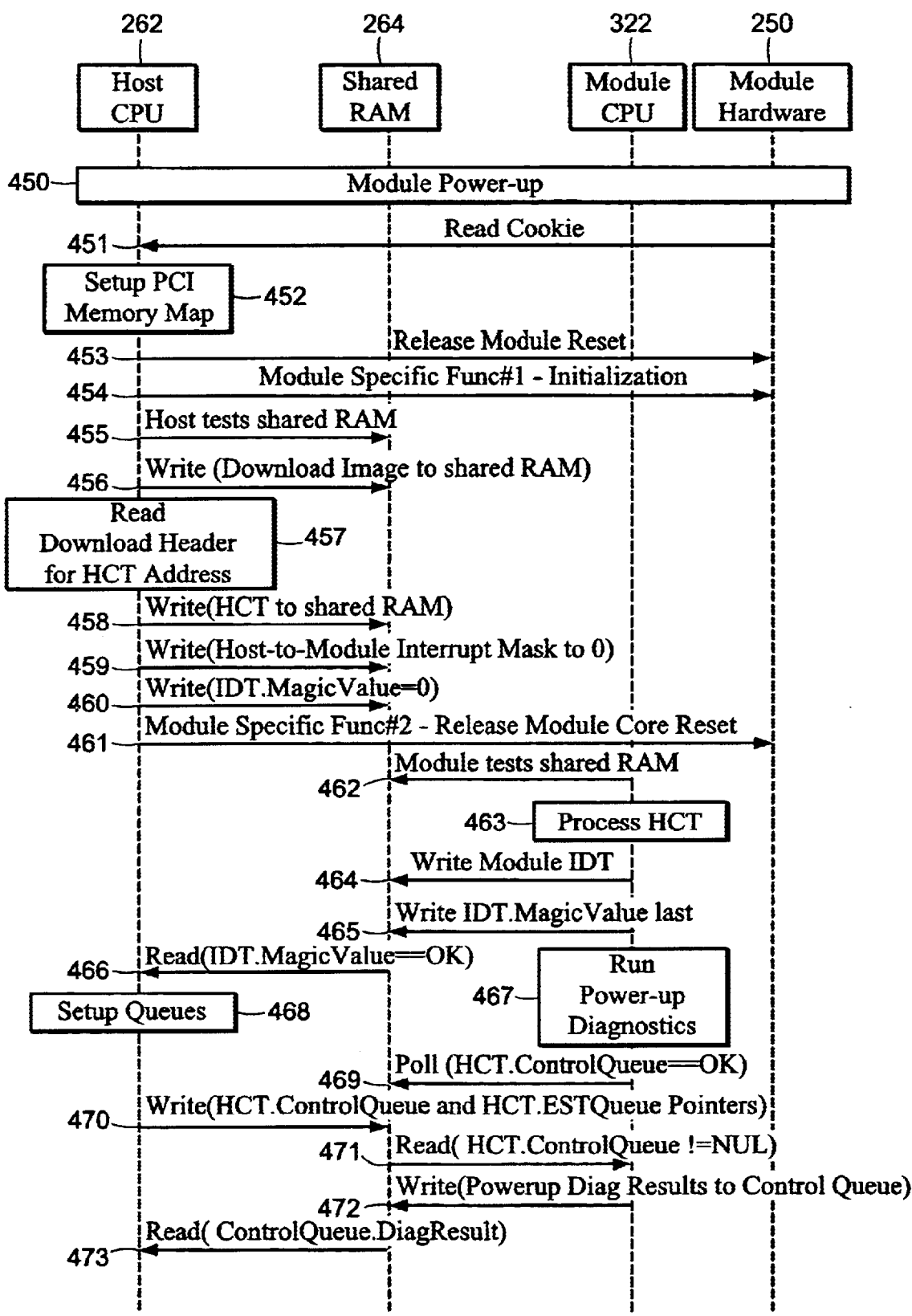
FIG. 8 illustrates the steps performed during a start-up sequence between a module and host configured according to the invention.

FIG. 8 illustrates the start-up operation between the module 250 and the host 260. In this figure, the left-hand column indicates messages, commands and signals originating from the host 260 which are sent over interface 320 to module 250. Conversely, the right-hand column indicates messages, commands and signals sent from the module 250 to the host 260. Many of the messages originate from either the host central processing unit 262 (i.e. carrier card processing unit) or the module controller 322 of the module 250 and write or read information to or from the shared memory 264. In other words, the shared memory 264 serves as a medium to relay messages and information between the host 260 and the module 250. Other commands and signals are sent directly between the processors 262 and 322.

The start-up operation begins at the top of the figure and progresses steadily downward, with each step being executed in turn. The arrows associated with certain steps indicate the direction of information flow. At step 450, the host 260 and module 250 are powered-up. The host CPU 262 then reads a "cookie" (not shown) from the module's serial EEPROM 326 in step 451. A "cookie" is a unique identification, such as a serial number, that allows the host 260 to determine the authenticity of the module 250. The host 260 then sets up a PCI memory map which determines the location and addresses of the shared memory 264. The module 250 is released from a reset mode in step 453 and initialization of the module 250 then begins in step 454.

The host 260 tests shared memory 264 in step 455 and writes or downloads a software image to the shared memory 264. The software image is the image executed by the module which allows the module to function properly. In step 457, the host 260 reads the download header of the image downloaded in step 456. The download header indicates where in shared memory 264 that the HCT 334 exists. The host 260 then populates the HCT 334 with values in steps 458 through 460, and releases the module controller 322 to begin executing the image downloaded in step 456. At this point in processing, the host 260 has established the HCT 334 in shared memory 264 and has provided the required information in the HCT 334 which the module 250 will need to determine how to configure itself.

In step 462, the module 250 begins to execute its image on module controller (CPU) 322 and tests the shared memory 264. Afterwards, the module 250 processes the HCT 334 by reading the field values 1 through 9 from the HCT 334 based on these values from the HCT 334, the modules writes configuration information into the IDT 333 in steps 464 and 465. That is, fields 1 through 9 are placed into IDT 333 at this point. Host 260 then reads the information from IDT 333 in step 466 to determine the services offered and the queues lengths required. The host 260 then establishes the queues 403 and 404 in step 468. Meanwhile, the module 250 runs power-up diagnostics in step 467.

Once the control queue 403 and EST queue 404 are established by the host 260, the module 250 polls for the existence of the control queue 403 in step 469 until an ok status is received. In step 470, the host 260 writes the Control_TX_Queue_Address_Offset, EST_TX_Queue_Address_Offset, Control_RX_Queue_Address_Offset and EST_RX_Queue_Address_Offset values (fields 5 through 8) into the HCT 334 for the newly established control queue 403 and EST queue 404. The size and location of the control queue 403 and EST queue 404 are under control of the host 260 and are specified through the HCT 334 via step 470. The module 250 then reads these fields in step 471. At this point, the module 250 and host 260 are able to communicate control and error and status messages between each other via queues 403 and 404. In step 472 and 473, the module 250 returns the status of the power-up diagnostics commenced in step 467. After steps 450 through 473 are complete, the IDT and HCT tables 333, 334 are initialized and service queue establishment is ready to be commenced.

Note that the GDB Debug queue 405 is optionally established and supported by the module 250. This queue may be setup and established in a similar manner as queues 403 and 404. If a module 250 supports the GDB debug queue 405, it will write a valid address offset into the IDT 333 at startup, which will be detected by the host 260 at which point this queue 405 will be established.

It should be understood that the actual exchange of data via queues may use a variety of known queue management techniques. For example, queue exchanges between an originator (i.e., host or module) and a receiver (the other of the host or module) can use a buffer descriptor list, free ring, and ready ring configuration, or a signaling mechanism of another sort.

Figure 9:
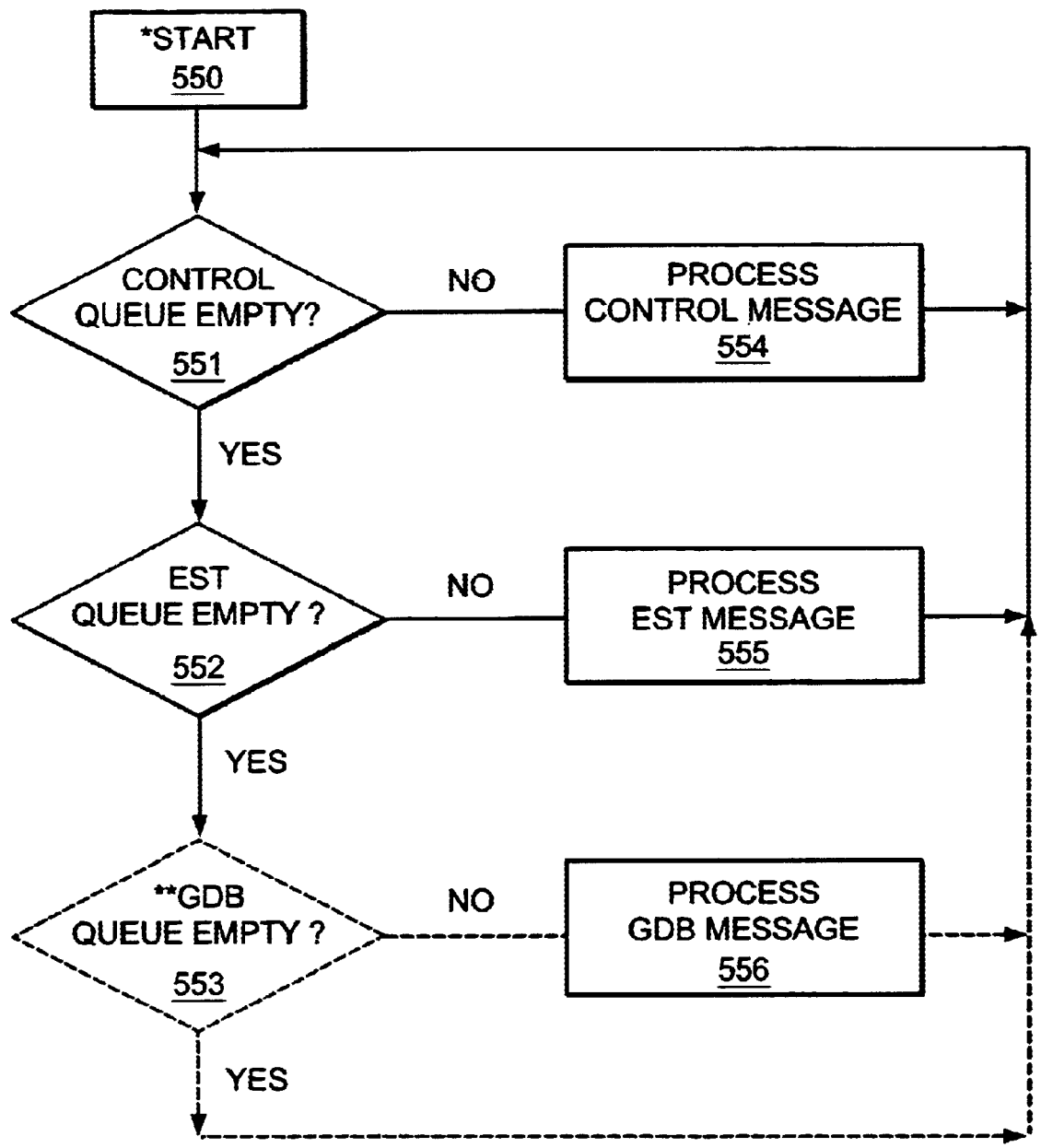
FIG. 9 is a flow chart of the queue processing strategy applied in both the host and the module to handle host-module and module-host messaging communication according to the invention.

FIG. 9 shows a flow chart of the processing logic performed to service the control queue 403, the EST queue 404, and optionally, the GDB Debug queue 405. The processing of FIG. 9 occurs out-of-band from the processing of any data by the module 250. That is, FIG. 9 processing occurs regardless of what queue processing occurs once data sessions begin to be serviced by the module 250. It is also noted that the processing of FIG. 9 occurs on both sides of the queues 403 through 405. Thus the host 260 and the module 250 each perform processing steps 550 through 556 to service the queues 403 through 405. In the module 250, the module controller 322 executes a message dispatcher process 407 (FIG. 7) which handles queue servicing.

The servicing of the out-of-band queues 403 through 405 begins once the processing of FIG. 8 is complete. In Step 500, queue processing commences and step 551 first checks to see if the control queue 403 is empty. If it is not empty, step 554 is executed to process the control message in the control queue 403 and then processing returns to the start 550. If in step 551, the control queue 403 is empty, queue service processing then checks to see if the EST queue 404 is empty in step 552. If the EST queue is not empty, step 555 processes any EST message in the EST queue 404 and returns processing to the start step 550. Finally and optionally, if the GDB Debug queue 405 is used, step 553 is processed if both the control queue 403 and the EST queue 404 were empty in steps 551 and 552. If the GDB Debug queue 405 is empty in step 553, processing returns to the start and repeats. If the GDB Debug queue 405 is not empty, step 556 processes the GDB message and returns to the start step 550 to repeat queue service processing.

In this manner, a queue service processing priority is established that first checks the control queue 403 for control messages, which are most important, and then checks the EST queue 404, and finally the GDB debug queue 405.

Once the control queue 403 and EST queue 404 are established and are being serviced via the processing of FIG. 9, the host 260 and module 250 are in communication. At this point, no data queues 402 have necessarily been established as initially, there are no active or setup data communications sessions. The mechanism by which the host 260 and module 250 interact to allow the servicing of connections uses an application programming interface (API) via the out-of-band control and EST queues 403 and 404 to pass messages back and forth.

An important aspect of the invention is the way in which a module 250 and host 260 interact with one another to determine an appropriate configuration that is dependant upon the services 340 offered by the module 250. The API provided by the invention includes a comprehensive set of message catalogs 299-1 through 299-N (FIG. 5) which include specific message formats to determine or control or configure, for example, specific services 340 within a module 250. There can be, for example, a message catalog 299 for each of the different service types, such as a packet gateway message catalog 299-4 for data services, a voice message catalog for voice services, a data/facsimile modem message catalog for data and facsimile protocols, an in-band signaling message catalog to control signaling events such as call setup, and so forth. Each message catalog 299 describes a set of host command messages and module responses that can be used to allow the host 260 to determine the services 340 offered by the modules 250. The service message catalogs can also be used to establish sessions of data communication using those services, where the services 340 of a particular type are controlled via the message catalog associated with that service 340. More specific details concerning each message catalog 299 will provided later, after a description of the general operation of the interface of this invention.

Through the use of the API, the carrier cards 260 and the modules 250 and the router 205 can appropriately configure themselves to most efficiently handle the data streams 331, 332 and 328, 329 for the different data services 340 that can be channeled through the modules 250 within the access server 200. A specific configuration may depend upon a service 340, for example, by allowing the alteration of queue depths, buffer sizes, error control used, flow control selected, and other aspects of communication. These parameters can be controlled via messages specific to the message catalog associated with the particular service. That is, the API allows the modules, carrier cards and router (250, 259 and 205) in the access server 200 to dynamically adjust their internal configurations to most effectively channel data communications. As such, the bandwidth for a particular type of service, such as data, video, fax or voice may be maximized while using only the hardware and processing resources necessary for that service.

All modules 250 support one or more services 340 which execute on the module 250. Generally, a service 340 is an algorithm that processes in-band data (versus out of band command and message communication between host and modules) between the TDM stream (331, 332 in FIG. 5) and the host platform 260. Services 340 are typically bi-directional and process both transmit and receive TDM stream data 331, 332 (FIG. 5). To standardize the services 340 supported by the interface mechanisms of this invention, each service 340 is assigned a unique service ID code. The service ID code is a 32-bit value which is made up of the service type and the service mode. Together, the service type and mode uniquely identify one processing algorithm which is supported by the module 250. There may be many service types offered on a single module 250 according to this invention. Service types define a general family of the service (i.e. Modem, Voice, Fax, Video, etc.) and the service mode defines the particular algorithm for that type (i.e., G.711, G.729, etc.).

Example service types offered by modules 250 configured according to this invention are universal data services, data and fax modem services, voice services, digital data services, in-band signaling services, fax relay services, modem relay services, video services, and so forth. Future services which have not yet been introduced into the field of networking are contemplated as being supported by modules 250 on this invention as well.

Modules 250 use "service groups" to report the number of sessions that can be supported by the module 250 for each service. Preferably, up to 16 service groups are supported by a module 250 in this invention. The actual number supported is determined by each modules 250 implementation. All modules support at least one service group. Services are assigned to groups based on their relative "cost" to support. Services are considered cheap if they require less processing and are thus assigned lower service group numbers than more expensive services which require high processing costs. An example of a cheap service is the voice G.711 protocol, while a video protocol may be an expensive service due to high bandwidth requirements. Thus, voice services such as G.711 may be assigned to service group 0, while Video services to be defined may be assigned a service group number such as 15. Table 3 below illustrates the relationship between services groups, services, and the maximum number of sessions supported by an example module 250.

TABLE 3

Group/Service/Session Relationship

| GROUP NUMBER | SERVICES | MAXIMUM NUMBER OF SESSIONS |
|---|---|---|
| 0 | G.711, V.110 | 50 |
| 1 | G.723, Data Modem, Fax Modem | 20 |
| 2 | G.728 | 10 |
| 3 | Video | 6 |
| 4–15 | Other/expensive | 0 |

Using a message query technique, a host 260 can query a module 250 via a special message to determine what services 340 are offered by the module 250. The information in Table 3 can be communicated to the host 260. During operation of the module 250 (i.e., while processing data), the module 250 can use messaging to report to the host platform 260 the number of remaining sessions that can be started for a service group number using a special message.

To facilitate the establishment of data queues 402 and to create active sessions that process data, various messages are communicated via the queues 402 through 405 between the host 260 and module 250. Generally, the three types of messages are 1) module messages, 2) session messages and 3) service messages.

Module messages are used to control operations at the module level on module 250. These messages support such things as self-test and diagnostics, module configuration control (discussed previously), software module resets, and data queue setup. Typically, module messages are used to control operations that effect the module 250 as a whole.

Session messages are used to control operations associated with session management. These operations include session setup and tear-down of a session, session start and stop, and session statistics and diagnostics. Any operation that affects a communications session independent of the services operating on data within that session falls into the category of being controlled via a session message.

Service messages are used to control generic operations associated with services 340. These includes set/get messages for access to service configuration parameters, and alternatively can include notification messages indicating that the service is initialized.

Additionally, as previously alluded to, the messaging protocol aspect of the invention includes service message catalogs. Service message catalogs define specific messages used to control each service type. That is, these catalogs define custom command, response, and notification messages required to control a specific service. The messages are typically specific to each service and are grouped accordingly. All messages include an ID that is unique so that the host 260 or module 250 will be able to identify any message and act accordingly.

Message exchanges between the host 260 and module 250 are categorized further as either "command messages", "response messages", or "notification messages."

Command messages are sent from the host 260 to the module 250. Command messages sent to the module 250 are destined for one of three locations: the module manager 324, the session manager 323, or a service 340. These three module entities 323, 324 and 340 provide varying levels of control that the host 260 can use to configure, manage and test the module 250, the sessions (e.g., communication connections channeling data through streams 331, 332, 328, 329), and the services 340, respectively. All command messages are sent to the module 250 through the control and EST queues 403, 404. Response messages are generated by the module 250 and received by the host 260 in response to a command. They are generated as a solicited response from a command message. Notification messages are unsolicited messages that are preferably asynchronously sent from the module 250 to the host 260.

Management of the modules 250 is accomplished via module command messages. Table 4 below illustrates module command messages available for use in a preferred embodiment:

TABLE 4

Module Command Messages Sent To Module 250 From Host 260

| MODULE COMMAND MESSAGE | DESCRIPTION |
|---|---|
| MODULE_SET_PARAM_CMD | Sets a module configuration parameter. Host 260 can use this to pass down all necessary operating information to the module. Typically this is used immediately after power-up. |
| MODULE_GET_PARAM_CMD | Queries a module configuration parameter |

TABLE 4-continued
Module Command Messages Sent To Module 250 From Host 260

| MODULE COMMAND MESSAGE | DESCRIPTION |
|---|---|
| MODULE_RUN_DIAG_CMD | Starts a diagnostic self-test. The tests commanded can vary in their intrusiveness and when they can be executed. Some tests require that the module 250 be idle with no active sessions. Other tests may require the software on the module to be re-downloaded. |
| MODULE_TEARDOWN_CMD | Performs a systematic tear-down of all sessions on the module. At the completion of this command, the module 250 will be idle with no active sessions and all data queues 402 and TDM streams 331, 332 will be unassigned. |
| MODULE_SETUP_DATA_QUEUE_CMD | Initializes the data queue information to exchange in-band data buffers. The host 260 uses this command to instruct the module 250 about the location of the data queues 402. |
| MODULE_SETUP_INTERRUPT_CMD | Configures the module for interrupt use with message and data queues 402 through 405, if interrupt processing is supported. |
| MODULE_NOP_CMD | Pings the module to determine if an idle module 250 is still alive and available. |
| MODULE_GET_CAPABILITY_CMD | Queries a module for capabilities. Used during initialization of module/host. |
| MODULE_GET_SERVICES_CMD | Queries a module for currently supported services. Host 260 queries each service group separately until no services response is returned. |
| MODULE_SPU_CMD | Control or send a command to a service processing element. This message can enable and disable a service processing element. |
| MODULE_GET_INTERUPT_INFO_CMD | Queries a module for interrupt information regarding the interrupts supported. |

Table 5 below lists response messages that are sent to a host 260 from the module 250 in response to commands or events which occur at the module level, such as the commands from Table 4 above.

TABLE 5
Command Response Messages Sent from Module 250 to Host 260

| MODULE RESPONSE MESSAGES | DESCRIPTION |
|---|---|
| MODULE_ACK_RSP | Sent to host to indicate that a command message was received and successfully processed by the module. |
| MODULE_NAK_RSP | Sent to host to indicate that an erred command message was received by the module. The error indicated may be the result of either invalid message content or incorrect message timing. |
| MODULE_RUNTIME_ERR_NTF | Sent to host to indicate failure was detected within the module. |
| MODULE_DIAG_RSP | Sent to host after the module has completed executing one of the diagnostic self tests. Fields in message indicate tests that failed. |
| MODULE_DATA_QUEUE_CREATED_RSP | Sent to host to indicate the result of a module data queue setup command message. |
| MODULE_PARAM_RSP | Returns the value of a module configuration parameter. |
| MODULE_TEARDOWN_COMPLETE_RSP | Indicates to host that tear down of module is complete. |
| MODULE_CAPABILITIES_RSP | Used by module to indicate to host the features of the interface 400 which are supported by the module. |
| MODULE_SERVICES_RSP | Returned to host from module to indicate the services 340 supported, the service group of each service, and the maximum number of sessions per service group. |
| MODULE_NOP_RSP | Contains an echo word from the NOP command messages. |
| MODULE_SPU_NTF | Indicates the results of the module SPU command. |
| MODULE_INTERRUPT_INFO_RSP | Returns interrupt information including on-module locations for doorbell and handshake memory locations. |

Besides module command messages which control the general operation of the module as a whole, another aspect of the invention is session management using session command messaging. A session essentially is a service 340 that is processing data in some manner via a service processing unit 330. Sessions are managed between the host platform 260 and the module 250 using messages exchange between the host 260 and the session manager 323. All sessions transition through the same states during start-up, execution and tear-down.

An IDLE session state indicates that a session of the desired service 340 has been instantiated and its internal initiation is complete. At this point however, no TDM stream 331, 332 processing is occurring. In the IDLE state, a data queue 402 is active for in-band configuration and control queue 403 is available for sending out-of-band configuration messages to the session.

An ACTIVE session state indicates that a session has begun to process TDM stream data on channels 331, 332. Out-of-band service catalog messages can be sent to the service 340 session while in the ACTIVE state. That is, messages from the catalog associated with a service of the session can be used to control the service 340.

Another session state is RX_XOFF, which indicates that a service session 340 has ben flow controlled and no TDM receive stream data 331 will be processed. Transmit flow control occurs by the host 260 not posting any transmit data to the Transmit Data Queue of data queue 402-N that is associated with this session. Out-of-band service message catalog messages can be sent to the session while in this state.

Finally, a data communications session can be in the FLUSHING state. This state indicates that a session has been stopped or changed and that the service 340 is in the process of flushing any RECEIVE data from its associated data queue 402-N. A session will remain in this state until the host 260 (or module 250, depending on data flow direction) returns all outstanding data buffers thus acknowledging and indicating that the data has been removed from the data queue 402. Out-of-band service messages can be sent to a session in the FLUSHING state.

Table 6 below lists the session command messages that are sent from the host 260 to the session manager 323 to manage data queues 402 and services 340. The commands handles by the session manage can be service independent. They provide a standard method for control of the services 340 that the module 250 supports.

TABLE 6

Session Command Messages from Host 260 to Module 250

| SESSION COMMAND MESSAGE | DESCRIPTION |
|---|---|
| SESSION_SETUP_CMD | Instruct module to launch a service and assign a data queue to that service. |
| SESSION_TEARDOWN_CMD | Detaches a service from the TDM channel 331, 332 and the data queue 402. |
| SESSION_START_CMD | Start processing data using the service 340. |
| SESSION_STOP_CMD | Used to stop the exchange of in-band data between a TDM Transmit or Receive stream 331, 332 and the host 260. After the service 340 stops, it transitions to the FLUSHING state and no further data processing occurs. |
| SESSION_CHANGE_SERVICE_CMD | Used to change the service that is executing on the TDM channel 331, 332. |
| SESSION_QUERY_CMD | Query a service 340 for statistical information. |
| SESSION_SET_MAX_IN-FLIGHT_RX_BUFS_CMD | This command supports flow control of in-band receive data for a session of a service 340. |

As indicated in Table 6, the SESSION_SETUP_CMD is used to bind the service 330 to a data queue 402. To start a service, the host 260 must specify in the SESSION_SETUP_CMD command a session ID, a data queue ID, a service type/mode and if the session is a universal port. The session ID is assigned by the host 260 and is used in subsequent session management command messages to identify the instance of the service 340 that data is being sent to. The data queue ID indicates the source and destination data queue 402 of in-band data. The service type and mode specify the processing protocol (i.e., what specific service protocol) that will be executed, and thus also determines which service message catalog is to be used to control the service. The universal port indication in the SESSION_SETUP_CMD command is provided to indicate if the module 250 should reserve resources to support changing the session from one service 340 to another. Thus, the SESSION_SETUP_CMD allows the module 250 to prepare itself for the capability of changing services 340 in mid-session. In other words, a module 250 configured according to this aspect of the invention allows multiple services 340 to be offered to a single data communications session and allows the session to switch between the services 340 during the same call.

The second command used to control sessions of services 340 is the SESSION_TEARDOWN_CMD command. After this command executes, the TDM channels 331, 332 and data queue 402 associated with the packet data are no longer associated with the service 340 to which the command is directed and are available to be re-assigned. The service 340 will no longer respond to any service messages sent to it. Preferably, in operation it is recommended that the session be disabled prior to being torn down with this command. Disabling the session (via the SESSION_STOP_CMD) will stop the data exchange between the host 260 and the service 340 executing on the module 250 in a controlled manner. Any data buffers within the queues 402 through 405 will be flushed and any new queue data will be ignored. If the service 340 is not disabled prior to the tear-down command, the service 340 will drop any data buffers in progress and will immediately terminate.

One feature of this aspect of the invention is that if a host 260 posts messages to a service 340 on the module 250 that has been tom-down and the session ID has not be reassigned, the messages are dropped. However, if the session ID is reassigned, the messages to the session ID will be sent to the new service 340. In other words, a single data communications session (i.e., an instantiation of data transfer that is operated upon via a particular service 340) can be re-assigned to different services 340 during the life of the session. The session can maintain the same session ID. As such, messages sent to the session ID can be used to control the session no matter which service 340 is currently operating on data transferred within the session.

By using the SESSION_START_CMD, a service 340 can begin to process data. More specifically, the SESSION_START_CMD command is used to start the exchange of in-band data between a TDM channel 331, 332 and the host 260. After the service 340 has been setup (Using SESSION_SETUP_CMD), it is in the IDLE state and no TDM channel data processing is occurring. In order to have the service start processing TDM channel data, the host 260 sends the SESSION_START_CMD message to the module 250. Upon receipt of the SESSION_START_CMD, the service 340 for which the command was sent begins processing receive and transmit data bytes over the data queues 402 and the TDM Receive and Transmit ports 331, 332.

The SESSION_CHANGE_SERVICE_CMD command is used to change the service 340 that is being used to process data for the session (i.e., data passing over the TDM Transmit and Receive streams 331, 332). The host 260 is permitted to modify both the service 340 and the data queue 402 that is being used. When the new service 340 is started, it will be initialized with a set of default service parameter values and will be left in the IDLE state. The host 260 can then modify the local configuration of the service 340 if desired via other messages. When the desired configuration has been set, the host issues the SESSION_START_CMD command to instruct the new service 340 to begin processing data. The SESSION_QUERY_CMD can be used to query a session of a service 340 to determine its status. The host 260 can also use the SESSION_START_CMD command when a service 340 is being re-started on the same TDM channels 331, 332.

The session manager 323 and services 340 on the module 250 can respond to the session commands listed in Table 6 via a number of session response and notification messages as listed in Table 7 below. The session response and notification messages are sent from the session manager 323 executing on the module 250 to the host 260 and the commands indicate the disposition of the session command messages (Table 6) received from the host 260 and processed on the module 250.

TABLE 7

Session Response and Notification Messages

| SESSION RESPONSE/ NOTIFICATION MESSAGES | DESCRIPTION |
|---|---|
| SESSION_SETUP_COMPLETE_RSP | Contains results of the session setup command. |
| SESSION_TEARDOWN_COMPLETE_RSP | Contains results of the tear-down command. |
| SESSION_START_RSP | Contains results of the start command. |
| SESSION_STOP_RSP | Contains results of the stop command. |
| SESSION_STATUS_RSP | Contains results of a session query command indicating the session status. |
| SESSION_STATE_REACHED_NTF | Notifies the host 260 that the module service 340 has reached a particular session state. |
| SESION_REMOTE_FLOW_CONTROL_NTF | Notifies host 260 of far end flow control. |

As indicated in Table 7, the SESSION_SETUP_COMPLETE_RSP message indicates the results of the session setup or session change command messages. A failure to setup the session of a service 340 means that no resources (i.e., shared memory 264 or data queue 402 space) have been allocated and that TDM timeslots of the time multiplexed TDM streams 331, 332, data queues 402, and session ID are in the same state that they were in prior to the setup command. The timing of this response message is an indication that the session manager 323 on the module 250 has reserved TDM timeslots in the TDM channels 331, 332 and has allocated any required resources for this session of a service 340. A TDM timeslot map (not shown) is maintained and used to indicate the location the module 250 has chosen to start the service 340 for the session. The host 260 can thus direct in-band TDM data to the timeslot/stream for processing. The other response and notification messages are generally self-explanatory as indicated by their descriptions in Table 7.

Figure 10:
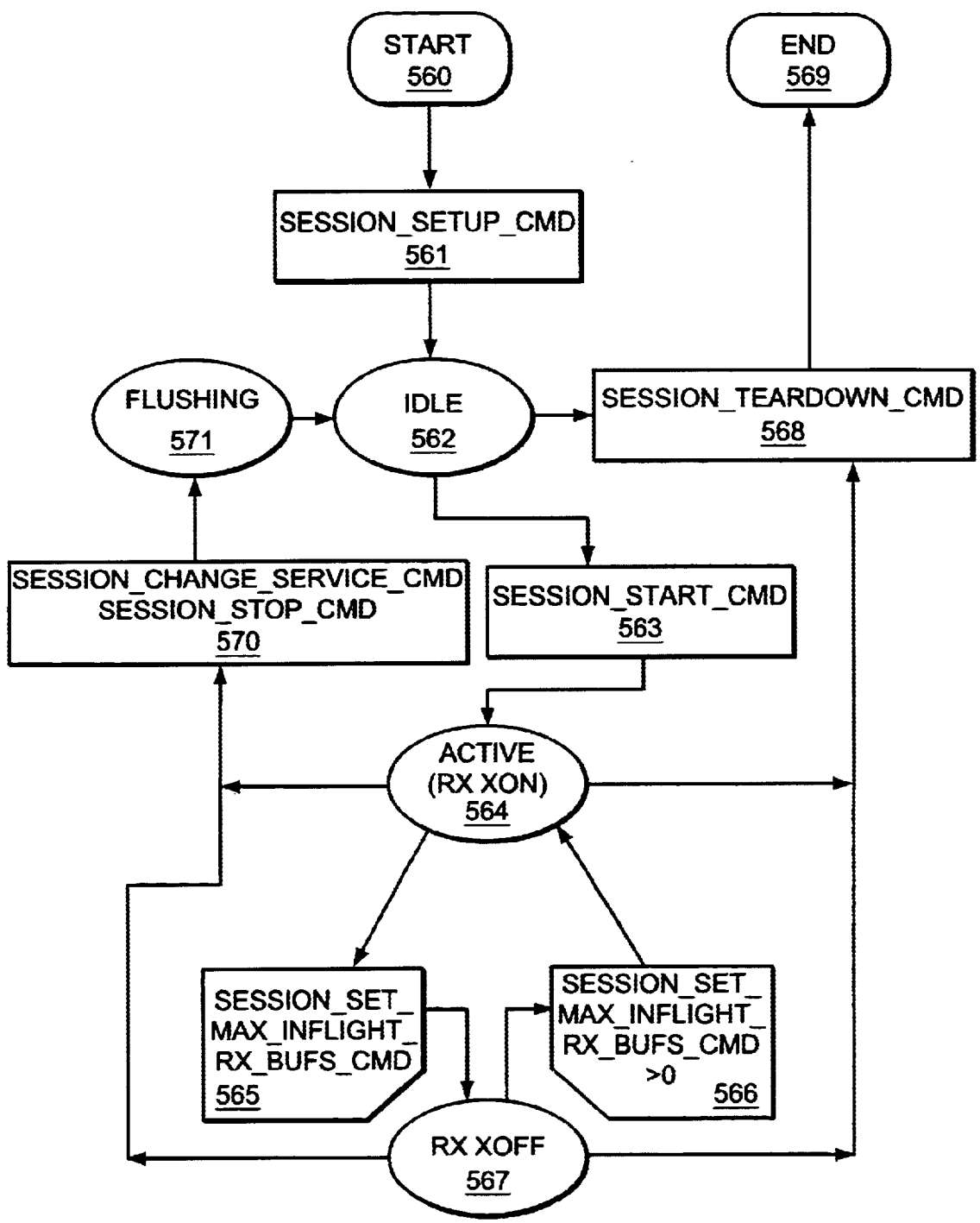
FIG. 10 is a flow chart of the states of a data communications session as managed by session command messages according to the invention.

FIG. 10 provides a flow chart of how data communications sessions using services 340 can transition between various states of IDLE, FLUSHING, ACTIVE and RX_XOFF via manipulation by session commands listed in Tables 6 and 7 above. In step 560, session processing starts and upon receipt of a SESSION_SETUP_CMD 661, the session enters the IDLE state 562. When the session is to begin processing data, a SESSION_START_CMD command 563 is received by the session manager 323 on the module 250 from the host 260 and processing enters the ACTIVE (RX_XON) state 564. Flow control can be accomplished as needed via SESSION_RX_XOFF_CMD and SESSION_RX_XON_CMD commands 565, 566 which transitions the data communications session between the RX_XOFF state 567 for no flow and the ACTIVE state 564 for data flow. In either the ACTIVE state 564 or the flow control off RX_XOFF state 567, if a SESSION_CHANGE_SERVICE_CMD or a SESSION_STOP_CMD messages 570 are received, the session transitions to the FLUSHING state 571 and then to IDLE 562. In either the IDLE 562, ACTIVE 564 or flow control off RX_XOFF 567 states, if the SESSION_TEAR_DOWN_CMD command 568 is received, the session ends 569. In this manner, session control can be accomplished using the commands from Tables 6 and 7 to transfer data communications sessions using service 340 between the various states. These messages thus provide a generic mechanism by which the host 260 can control the module 250 its sessions, without being concerned with the specifics of sessions of particular service types.

Another aspect of the messaging interface between the host platform 260 and the module 250 is management of services 340 on the module 250. The interface being described herein provides a few generic messages that are used to communicate with the service 340 executing on the module 250. These messages are intended to standardize the method all services 340 use to access their configuration parameters 337, 338.

Service configuration parameters 337, 338 (FIG. 5) are provided for each service 340 as a means for the host 260 to configure and control the operation of a service 340 on a module 250. For each service type that the module 250 supports, a unique set of configuration parameters (Default set 337 and specific or local set 338) exists that controls the operation of that service 340. Within each configuration parameters set 337, 338, the actual parameters can be divided into two groups: static and dynamic.

Static parameters are those that are established while the service 340 is disabled (i.e., before any data processing occurs). Static parameters do not change while the service 340 is enabled. Dynamic parameters are those which can be altered while the service 340 is enabled and processing data. Dynamic parameters take effect immediately. Each service 340 determines which of its own parameters are static or dynamic. The messaging interface treats both static an dynamic parameters the same, and it is up to the host 260 and service 340 to define how each parameter is expected to be controlled.

Within the module 250, a default configuration set 337 is maintained for each service type 340. The default configuration 337 represents the values used to start the service 340 when the SESSION_SETUP_CMD command is received. Since each service 340 on a module 250 requires a context to initialize itself, the default configuration set 337 is used for this purpose. The default configuration values for each service type can be retrieved or modified using "service set" and "service get" commands, as will be explained. To reference the default configuration parameters 337, the service type must be specified.

Once a service 340 has been set up using the SESSION_SETUP_CMD command, that service 340 has it's own local configuration parameter set 338. That is, once a service 340 is setup, it maintains a distinct set of parameters 338 which are local to that service. Any changes made to the default configuration 337 for the general service 340 at that point do not immediately affect a service 340 that has been setup and that has "copied" the general default configuration 337 into a local set of parameters 338 for use by that instantiation of the service 340. That is, each set up service 340 maintains its own set of local parameters 338 that are initially based upon the default set 337. Changes to the static parameters of either the default set 337 or the services 340 local set 338 made after a particular service 340 is setup do not effect the set up service 340. However, changes made to dynamic parameters within the local configuration 338 associated with the set up service 340 take effect immediately. Changes made to the static parameters within the local configuration 337 associated with an instantiated service 340 do not take effect unless the service is stopped and restarted.

This aspect of the invention thus provides two mechanisms for a host 260 to configure a service 340. In the first method, the host 260 writes all configuration parameter values into the default configuration set 337 for a type of service 340. Next, the host 260 issues the session setup command to start the service 340. Finally, the host 260 issues the session start command to begin processing data by the service 340. In this case, the service 340 will use the default set 337 as its own local set 338.

Alternatively, the second method begins with the host 260 issuing the session setup command to start the service 340 with the default configuration parameters 337. The host 260 then writes the new configuration parameter values into the service's local configuration 338, which allows the host 260 to immediately modify a service 340 by changing parameters in set 338. Next, the host can issue the session start command to start the service with the new configuration values of dynamic or static parameters in set 338, and begin processing data by the service 340.

Either method will work and it is up to the host 260 to decide which method is used. In this manner, this aspect of the invention provides a way to alter services dynamically. Moreover, as services change over time, a module configured with a default set 337 for each service type can be updated using the messages to alter the default set 337 or the local set 338.

Table 8 below lists the various service command messages that are sent from the host 260 to the module 250 to manage default and local service configuration parameters associated with the services 340.

TABLE 8

Service Command Messages Sent from Host 260 to Module 250.

| SERVICE COMMAND MESSAGE | DESCRIPTION |
| --- | --- |
| SERVICE_SET_DEFAULT_PARAM_CMD | Set the default configuration values associated with a service type 340. |
| SERVICE_SET_LOCAL_PARAM_CMD | Set the local configuration values for a local instantiation of a service 340 set up on a module 250. |
| SERVICE_GET_DEFAULT_PARAM_CMD | Obtain the default configuration values associated with a service 340 type. |
| SERVICE_GET_LOCAL_PARAM_CMD | Obtain the local configuration values for a local instantiation of a service 340 setup on a module 250. |

As noted previously, the SERVICE_SET_DEFAULT_PARAM_CMD command passes down to the a service 340 from the host 260 all necessary operating information to a default configuration area 337 associated with a service 340 prior to the session start command message. Any changes made to the service default configuration 337 will have no affect on a service 340 that is already setup, however any subsequent session setup commands messages will pick up the new configuration values in the configuration 337.

The SERVICE_SET_LOCAL_PARAM_CMD command is used to set the configuration parameters contained with the services local configuration 338. The host 260 can use this command to pass down all necessary operating information to a service 340 that has been set up. Any changes made to the dynamic parameters will take effect immediately on the service 340, while changes made to static parameters will only take effect if the session is stopped and restarted.

In response to the messages and commands of Table 8, service response messages are sent to the host 260 for the services 340 in response to configuration queries. Table 9 below lists the service configuration response messages sent from the service 340 on module 250 to the host 260.

TABLE 9

Service Response Messages Sent From Module 250 to Host 260

| SERVICE RESPONSE MESSAGE | DESCRIPTION |
| --- | --- |
| SERVICE_DEFAULT_PARAM_RSP | Passes back results of the get default parameter query for a service type 340. |
| SERVICE_LOCAL_PARAM_RSP | Passes back results of a get local parameter query from a set up service 340. |

Each of the service response messages in Table 9 can return result code which indicate various information about the configuration of a service 340. Information such as Session ID, Data Queue ID, Receive Memory Block, Transmit Memory Block, and resources in use (i.e., data queues being used, service ID in use, timeslots in use, and so forth) can be included in the response messages. This allows the host 260 to determine the current configuration of services 340.

One objective of the system provided by this invention is to standardize the communication and control mechanisms used between modules 250, carrier cards 259 and router 205 in devices such as an access server 200. The prior art paradigm is to create a new carrier card for each platform (i.e., access server, router, bridge, switch, as so forth) each time a new port card module is developed to offer a new service (i.e., fax, data, voice, and so forth). The reasoning behind this prior art approach is caused in part by differences in physical connectors as well as variances in port card module architectures to support the differing services. Thus, prior art modules varied due to service requirement variations, and the carrier cards varied in prior art systems as well since they provided the glue layer between the modules and the host system or platform.

Benefits provided by the design of the module 250 and carrier card 259 include Universal Port Control which provides consistent port control independent of the port application or service 340 offered. The system also provides backward compatibility with existing interface specifications (such as the Portware API and Symphony DSP Host Interface specifications manufactured by Cisco Systems of San Jose, Calif.), which are implemented in the router internetwork operating system (IOS) and are downloaded into the firmware of the module 250 at boot time.

Scalabilty is also provided which can support extremely high density port card modules 250 that can take advantage of future developments and miniaturization of components to allow higher connection densities per module 250. This systems also provides extensibility for future support for additional port applications and services not yet on the market. In operation, the system of this invention maximizes the data throughput rate and minimizes latency, the time spent processing each datagram or packet in shared memory 264. The system also supports both polled and interrupt notification methods and is generally based on a "black box" design of module 250 allowing the module 250 to act as a plug-and-play component for a multi-service carrier card 259 or router backplane.

Using the interface mechanisms described herein including the software messaging system and API, only one carrier card 259 per platform (i.e., dial shelf 204) is required. The carrier card 259 can be populated with a variety of modules 250 which support differing applications and services such as modem, voice, ISDN, and so forth. This approach eliminates redundant software development and increases the re-use achieved on a carrier card 259. It also permits modules 250 that conform to the NextPort API and form-factor to be swapped among platforms.

It should be understood by those skilled in the art that the architecture and operation of module 250 supports a methodology which hides the TDM stream and timeslot selection from the host 260. That is, when a service 340 is started by detection of incoming data 331, the module 250 makes the decision which stream and timeslot should be used for this service 340. In this way, the module 250 is responsible for management of TDM streams 331 and resources (i.e., services 340) on the module 250, not the host 260. This allows a module 250 to support many different services 240 and also provides support for private streams to a module which can be mapped from various TDM streams 302 (FIG. 3) arriving from the framer trunk cards over a TDM backplane within the dial shelf 204. Call management, however, is not handled by the module 250. Rather, call management is handled by another circuit, such as the framer trunk cards 210 or the host 260.

By providing multiple services within one module 250, TDM stream management is placed within the module 250, rather than being controlled by the host 260 or another circuit, as in prior art systems. This avoids the prior art problems of requiring a host 260 or other component from having to understand what stream 331, 332 can be used to start a particular service on which module, and then having to command the module to start the service on that stream.

Since the system de-couples the host 260 from the intimate details of any specific module or service, future modules can be integrated with a minimal impact on the host 260. The interface 400 also allows services 340 to provide support for connections of varying types, such as digital modems, fax modems, ISDN technologies, voice and video services, and so forth.

By allowing the module 250 to determine service support and operational characteristics, ever increasing port densities are supported by a module 250 configured according to the invention. Moreover, a universal session solution is provided herein that can accommodate any service on any connection and can allow a connection to change service without having to re-establish a connection. Scalabilty and expandability problems encountered with previous generations of prior art modules are also solved.

The system of the invention allows the ability to adapt to the requirements of future services. The messaging API system of this invention utilizes the shared memory interface via shared memory 264 to encapsulate the capabilities of a particular module 250 into the tables 333 and 334 that processing within the IOS executing on the router shelf 205 or carrier card 259 can interpret. Since the tables 333 and 334 can be used to define the eventual methods and configuration parameters selected to communicate with any module 250 which supports the API, flexibility is provided for future capabilities of modules 250 and carrier cards (hosts) 260, and router shelf 205. The Tables 333 and 334 also allow the control and status messaging, data queues, and application and service types supported by modules 250 on hosts 260 to be announced to the router systems in the router shelf 205 via the API system. This allows the router to dynamically identify module cards 250 that have been inserted into the carrier card/host backplane 260 and allows determination of services 340 and function supported overall by the dial shelf 204.

Also, as service standards change, future modules 250 that are developed to support any new services 340 will be supported by carrier cards 260 that can inquire as to the new requirements of the new service. For example, a voice service standard may specify a specific packet length which could change in future versions of the standard. When a host 260 using the system of the invention requests the packet length for the configuration 337, 338 for the service 340 on a new module 250, the most up-to-date information will be provided and the host 260 can correctly implement the new version of the service 340.

Likewise, if a service changes, an older module 250 that uses an out-of-date packet length but that is equipped with this invention can be updated by changing, for example, the configuration 337, 338 for a service 340 that is initially configured for the old packet length. As the voice standard is changed, a module 250 supporting this change is detected via the system described herein. As such, queue lengths and buffer sizes can be adjusted to most accurately support the new voice standard. Further still, instead of having to provide a new module 250 encoded with the change, the API can be used to inform the programmable module card 250 to adjust it's existing voice standard protocol configuration 337, 338 to reflect the changes made in the new standard.

As discussed previously, services 340 within the modules 250 can be controlled in this invention using messages. The particular messages used are preferably selected by the host 260 from service message catalogs 299 (FIG. 5) which are maintained in the host 260. Each service message catalog 299 includes one or more messages each having a unique identification number (ID) which falls within a range of message numbers assigned to that message catalog 299. During the startup procedure (FIG. 7), when a module 250 returns a one or more service ID numbers in the IDT table 333 indicating to the host 260 which services 340 are supported by that module 250, the host 260 can select message numbers from the range of messages associated with the services offered.

For example, if a module 250 supports data and fax modem services, service IDs in the IDT 333 will exist for a data service, a fax service, and a data/fax service. Using the service ID numbers, the host 260 can uses the messages from the data/fax message catalog 299-2 to control these services 340, by selecting messages having message numbers in the range associated with each of these services 340. In other words, the API of this invention reserves ranges of message ID values for each message for each service 340 in a service message catalog 299. Examples of the types of message catalogs 299 that exist are a digital data message catalog, a data/fax modem message catalog, a packet gateway service message catalog and an in-band signaling catalog. These are merely examples and the invention is not limited as such. Other service message catalogs can be created and used for other services, such as video, for example.

The digital data service message catalog 299-1 contains messages that are exchanged between the host 260 to the module 250 to establish and control sessions of services 340 that support digital data communication via the Integrated Services Digital Network (ISDN) protocols. Messages within this catalog can be used to control and establish digital data configuration parameters such as the mode of digital data communications (i.e., Clear Channel, V120, V 110), line speed (i.e., 600 bps up to 64 Kbps), flow control, data and parity and stop bit selection, and PPP/SLIP enablement. Also, ISDN dial-out numbers may be passed between the host 260 and the module 250 using messages in this message catalog.

The data/fax modem message catalog 299-2 defines the message formats for use with data and fax modem services 340 within a module 250. Modem command messages within the data/fax message catalog 299-2 control operations of data and fax modem services 340 include messages for performing operations such as initiating modem rate negotiations, modem testing, selecting framing modes, setting escape map sequences for PPP modes, retrieving modem states and link status and configuration and rate of service information. Response messages from the module 250 to the host 260 include modem and fax state responses, link responses, configuration responses, break detection, and dialstring return messages to the host 260.

An in-band signaling message catalog 299-3 is provided which includes messages used to provide control and notification of signaling events. Signaling messages in message catalog 299-3 are exchanged between the host 260 and the module 250 to manage such tasks as generating dial digits, starting and stopping dial digit generation, and starting and stopping the generation of call progress tones. Corresponding response message sent from the module 250 to the host 260 are also provided. The in-band signaling messages can encode standardized DTMF/MF/R1 and R2 digit encoding, as used by modems and other devices when providing call services. These messages can be used, for example, to allow signaling to a modem service 340 to generate digits to place a call onto WAN 101 or 102 (FIG. 1).

A packet gateway service message catalog 299-4 is also provided as an aspect of this invention. Packet gateway services 340 are those that perform the conversion of traditional telephony service (e.g., data, fax, modem) for transport through a packet network, such as LAN 120 (FIG. 1). This gateway connection can provide a bypass connection between two telephony (i.e., circuit switched) networks, or may be used between a telephony gateway and a native packet network such as LAN 120, or the Internet. Configuration parameters established and controlled through the use of packet gateway messages from message catalog 299-4 include such parameters as input and output gain; in-band signal detection enablement for fax, modem and voice; echo, noise and gain cancellation and control, playout de-jitter modes and delays, loop-back enablement, SSRC and VPXCC parameters, framing support, sequence numbering and other related parameters involved with call handling as understood by those skilled in the art.

Voice service command messages can also be provided within the packet gateway message catalog 299-4 to control aspects of voice services 340 such as starting and stopping in-band tone generation, generation of dial digits, and queries for information from the voice service 340. Response messages sent form the module 250 to the host 260 related to packet gateway services for voice, fax and data includes messages related to dial digit detection, playout control statistics, voice levels, and other statistics.

Command and response messages are also provided in packet gateway message catalog 299-4 for facsimile and modem data services such as fax relay (transmit, receive, playout, control and data pump statistics) and modem relay control.

Figure 11A:
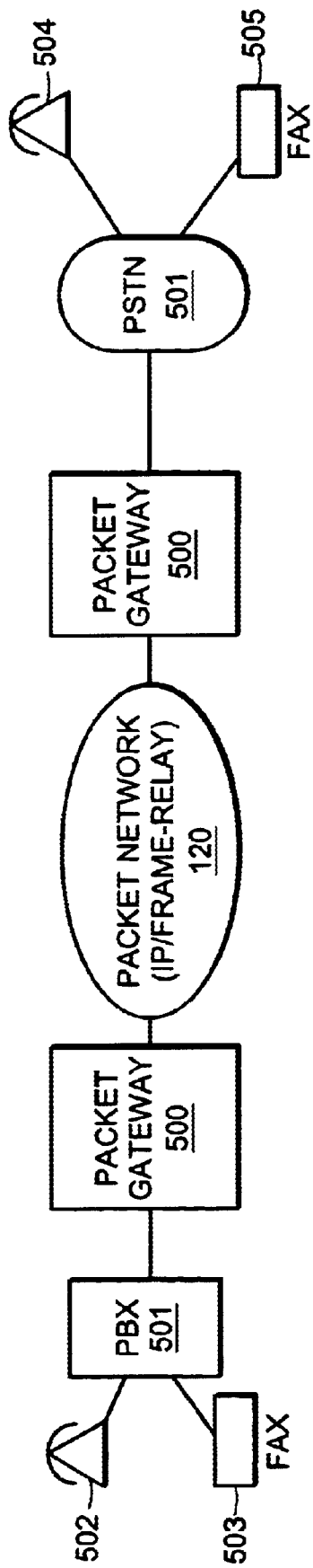
FIG. 11A is an example illustrating how two access servers configured according to this invention can serve as packet gateways between two circuit-switched networks.
Figure 11B:
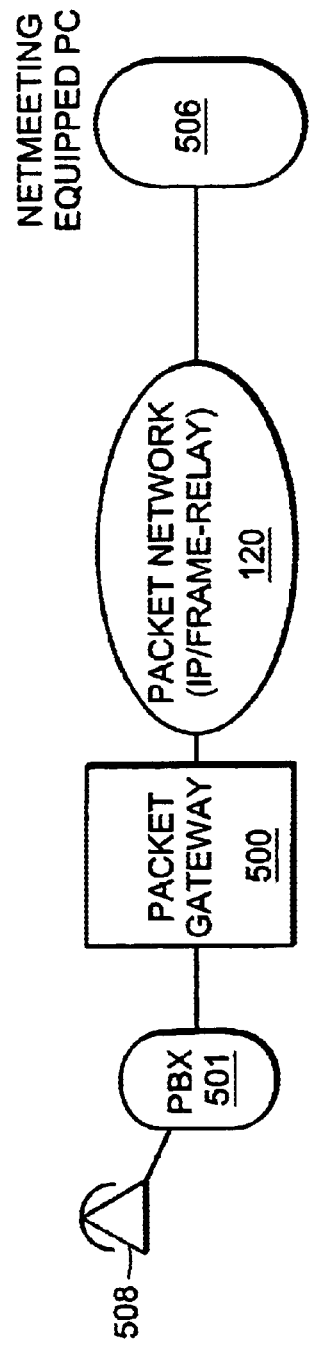
FIG. 11B is an example illustrating how an access server configured according to this invention can serve as a packet gateway between a circuit switched and a packet-switched network.

FIGS. 11A and 11B illustrate an example of the invention used as a packet gateway 500 for conversion of information from hosts 502, 503 on a traditional telephony service network 501 (e.g. voice or modem data from host 502, fax from host 503) for transport over a packet network 120 to another gateway 500 and on to recipients 504 and 505. The packet gateway 500 equipped with the invention can provide a bypass connection between two telephony end points 501 as shown in FIG. 11A, which would normally use a telephone network to provide end-to-end service.

Alternatively, as shown in FIG. 11B, a packet gateway 500 equipped with this invention can serve as a gateway between an end-user 508 and a personal computer 506 coupled to packet network 120 that is equipped with application software such as NetMeeting which provides voice-over-IP service to a user of the personal computer 506.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A module providing data communications services, the module comprising:

an interface transferring a plurality of streams of data into and out of the module; a plurality of service processing elements coupled to the interface, the plurality of service processing elements supporting a plurality of services which operate on the streams of data being accepted through the interface;

a processor coupled to the interface and the plurality of service processing elements, the processor processing the plurality of services on the streams of data; and a shared memory including:

an identity table created upon start-up of the module, the identity table containing information identifying each of the plurality of services supported by the module;

a host configuration table created upon start-up of the module, the host configuration table identifying a configuration of a host that is hosting the module.

2. The module of claim 1 wherein the shared memory includes:

a downloaded module image which executes on the processor and reads the host configuration table to determine the configuration of the host that is hosting the module and creates information identifying each of the plurality of services supported by the module and places the information identifying each of the plurality of services in the identity table allowing the host that is hosting the module to read the identity table to determine the plurality of services are offered by the module.

3. The module of claim 1 herein the host configuration table and the identity table are expandable to define configuration parameters associated with additional services by the addition of fields to the host configuration table and the identity table, such that additional services defined do not adversely effect pre-existing services.

4. A method of configuring a host to interoperate with a module, the method comprising steps of:

coupling the module to a host;

providing, from the host to the module, information concerning mechanisms offered on the host to support services offered by the module;

providing, from the module to the host, information concerning which of a plurality of services are to be offered by the module;

configuring mechanisms in the host and the module so that the host can control the module to offer the plurality of services to streams of data passing through a data communications device; and wherein the step of providing, from the host to the module, information concerning mechanisms offered on the host to support services offered by the module includes the steps of:
  downloading an executable image accessible to the module from the host, the executable image executing on the module;
  writing a host configuration table accessible to the module from the host, the host configuration table indicating to the module the mechanisms offered on the host to support services offered by the module.

5. The method of claim 4, wherein the step of providing, from the module to the host, information concerning which of a plurality of services are to be offered by the module includes the steps of:
  executing the executable image on the module to read the information from the host configuration table to determine the mechanisms offered on the host to support services offered by the module;
  writing a module identity table accessible to the host from the module, the module identity table indicating information concerning services offered by the module.

6. The method of claim 5, further including the step of indicating how many sessions can be supported for each service by the module.

7. The method of claim 5, wherein the step of configuring mechanisms in the host and the module so that the host can control the module to offer the plurality of services to connections passing through the data communication device includes the steps of:
  reading, from the host, the module identity table to determine which services are offered by the module for data to be transferred through the host and module;
  establishing appropriate queues accessible by the module and the host which allow data to be buffered between the host and the module as the data is processed by at least one of the plurality of services offered by the module.

8. A method of configuring a host to interoperate with a module, the method comprising steps of:
  coupling the module to a host;
  providing, from the host to the module, information concerning mechanisms offered on the host to support services offered by the module;
  providing, from the module to the host, information concerning which of a plurality of services are to be offered by the module; and
  configuring mechanisms in the host and the module so that the host can control the module to offer the plurality of services to streams of data passing through a data communications device;
  providing a plurality of service message catalogs containing messages related to particular services offered by the module;
  at the host, selecting and sending particular messages selected from a service message catalog associated with a service to the module to establish, control and configure the service within the module; and
  wherein the step of configuring mechanisms in the host and the module so that the host can control the module to offer the plurality of services to connections passing through the data communication device includes the steps of:
    sending module command messages from the host to the module to manage the configuration of the module; and
    returning, from the module to the host, module response messages sent in response to specific module command messages, the module response messages indicating the status of module configuration processing performed by the module command message in the module.

9. The method of claim 8, wherein the plurality of service message catalogs include a digital data message catalog, a data/fax/modem message catalog, an in-band signaling catalog, and a packet gateway service catalog.

10. A method of configuring a host to interoperate with a module, the method comprising steps of:
  coupling the module to a host;
  providing, from the host to the module, information concerning mechanisms offered on the host to support services offered by the module;
  providing, from the module to the host, information concerning which of a plurality of services are to be offered by the module; and
  configuring mechanisms in the host and the module so that the host can control the module to offer the plurality of services to streams of data passing through a data communications device; and
  wherein the step of configuring mechanisms in the host and the module so that the host can control the module to offer the plurality of services to streams of data passing through the data communication device includes the step of:
    providing a distinct service message catalog for each of the plurality of services;
    detecting a connection associated with a service;
    selecting messages from the service message catalog and sending the messages from the host to the module in order to establish a session of a service for the connection.

11. An access server comprising:
  a host processing unit;
  a shared memory unit;
  a host interface;
  a bus coupling the host processing unit and the shared memory unit and the host interface;
  the host processing unit detecting insertion of a multiple-service module into the host interface and interrogating the multiple-service module to determine what services are offered by the multiple-service module, and configuring a service configuration in the shared memory unit for each service offered, so as to allow the host processing to interoperate with the inserted multiple-service module to provide at least one data communications session over the bus according one of the services offered by the multiple-service module;
  a plurality of service message catalogs, one per service offered by the module, each service message catalog containing messages related to particular services offered by the module; and
  wherein the host processing unit selects and sends particular messages selected from a service message catalog associated with a service to the module to establish, control and configure the service within the module to process the at least one data communications session.

12. A module providing data communications services, the module comprising:
  an interface means for transferring a plurality of streams of data into and out of the module;
  a plurality of service processing element means coupled to the interface means, the plurality of service processing element means supporting a plurality of services which operate on the streams of data being accepted through the interface means;

a processor means coupled to the interface and the plurality of service processing elements, the processor processing the plurality of services on the streams of data; and a shared memory means including:
- an identity table means created upon start-up of the module, the identity table means containing information identifying each of the plurality of services supported by the module;
- a host configuration table means created upon start-up of the module, the host configuration table identifying a configuration of a host that is hosting the module.

13. The module of claim 12 wherein the shared memory means further includes:
a downloaded module image means which executes within the processor means and reads the host configuration table to determine the configuration of the host that is hosting the module and creates information identifying each of the plurality of services supported by the module and places the information identifying each of the plurality of services in the identity table allowing the host that is hosting the module to read the identity table to determine the plurality of services are offered by the module.

14. The module of claim 12 wherein the host configuration table and the identity table are expandable to define configuration parameters associated with additional services by the addition of fields to the host configuration table and the identity table, such that additional services defined do not adversely effect pre-existing services.

15. A computer program product comprising:
a computer usable medium for configuring a host to interoperate with a module;
a set of computer program instructions embodied on the computer usable medium, including instructions to:
couple the module to a host;
provide, from the host to the module, information concerning mechanisms offered on the host to support services offered by the module;
provide, from the module to the host, information concerning which of a plurality of services are to be offered by the module;
configure mechanisms in the host and the module so that the host can control the module to offer the plurality of services to streams of data passing through a data communications device; and
wherein the instruction to provide, from the host to the module, information concerning mechanisms offered on the host to support services offered by the module includes instructions to:
download an executable image accessible to the module from the host, the executable image executing on the module;
write a host configuration table accessible to the module from the host, the host configuration table indicating to the module the mechanisms offered on the host to support services offered by the module.

16. The computer program product of claim 15, wherein the instruction to provide, from the module to the host, information concerning which of a plurality of services are to be offered by the module includes instructions to:
execute the executable image on the module to read the information from the host configuration table to determine the mechanisms offered on the host to support services offered by the module;
write a module identity table accessible to the host from the module, the module identity table indicating information concerning services offered by the module.

17. The computer program product of claim 16, further including an instruction to indicate how many sessions can be supported for each service by the module.

18. The computer program product of claim 16, wherein the instruction to configure mechanisms in the host and the module so that the host can control the module to offer the plurality of services to connections passing through the data communication device includes instructions to:
read, from the host, the module identity table to determine which services are offered by the module for data to be transferred through the host and module;
establish appropriate queues accessible by the module and the host which allow data to be buffered between the host and the module as the data is processed by at least one of the plurality of services offered by the module.

19. A computer program product comprising:
a computer usable medium for configuring a host to interoperate with a module;
a set of computer program instructions embodied on the computer usable medium, including instructions to:
couple the module to a host;
provide, from the host to the module, information concerning mechanisms offered on the host to support services offered by the module;
provide, from the module to the host, information concerning which of a plurality of services are to be offered by the module; and
configure mechanisms in the host and the module so that the host can control the module to offer the plurality of services to streams of data passing through a data communications device;
provide a plurality of service message catalogs containing messages related to particular services offered by the module;
at the host, select and send particular messages selected from a service message catalog associated with a service to the module to establish, control and configure the service within the module; and
wherein the instruction to configure mechanisms in the host and the module so that the host can control the module to offer the plurality of services to connections passing through the data communication device includes instructions to:
send module command messages from the host to the module to manage the configuration of the module; and
return, from the module to the host, module response messages sent in response to specific module command messages, the module response messages indicating the status of module configuration processing performed by the module command message in the module.

20. The computer program product of claim 19, wherein the plurality of service message catalogs include a digital data message catalog, a data/fax/modem message catalog, an in-band signaling catalog, and a packet gateway service catalog.

21. A computer program product comprising:
a computer usable medium for configuring a host to interoperate with a module;
a set of computer program instructions embodied on the computer usable medium, including instructions to:

couple the module to a host;
provide, from the host to the module, information concerning mechanisms offered on the host to support services offered by the module;
provide, from the module to the host, information concerning which of a plurality of services are to be offered by the module; and
configure mechanisms in the host and the module so that the host can control the module to offer the plurality of services to streams of data passing through a data communications device; and
wherein the instruction to configure mechanisms in the host and the module so that the host can control the module to offer the plurality of services to streams of data passing through the data communication device includes instructions to:
provide a distinct service message catalog for each of the plurality of services;
detect a connection associated with a service;
select messages from the service message catalog and sending the messages from the host to the module in order to establish a session of a service for the connection.

22. An access server comprising:
a host processing means;
a shared memory means;
a host interface means;
a bus means for coupling the host processing means and the shared memory means and the host interface means;
the host processing means detecting insertion of a multiple-service module means into the host interface and interrogating the multiple-service module means to determine what services are offered by the multiple-service module means, and configuring a service configuration in the shared memory means for each service offered, so as to allow the host processing means to interoperate with the inserted multiple-service module means to provide at least one data communications session over the bus means according one of the services offered by the multiple-service module means;
a plurality of service message catalogs, one per service offered by the module, each service message catalog containing messages related to particular services offered by the module; and
wherein the host processing means selects and sends particular messages selected from a service message catalog associated with a service to the module to establish, control and configure the service within the module to process the at least one data communications session.

* * * * *